(12) United States Patent
Chen et al.

(10) Patent No.: US 10,265,996 B2
(45) Date of Patent: Apr. 23, 2019

(54) INK EDGE ANTI-COUNTERFEITING METHOD AND INK EDGE ANTI-COUNTERFEITING NETWORK VERIFICATION SYSTEM

(71) Applicant: HAINAN YAYUAN ANTI-COUNTERFEIT TECH RES INST (GENERAL PARTNERSHIP), Haikou, Hainan (CN)

(72) Inventors: Mingfa Chen, Hainan (CN); Xiaowei Kong, Hainan (CN); Jinxia Cai, Hainan (CN)

(73) Assignee: HAINAN YAYUAN ANTI-COUNTERFEIT TECH RES INST (GENERAL PARTNERSHIP), Haikou (CN)

( * ) Notice: Subject to any disclaimer, the term of this patent is extended or adjusted under 35 U.S.C. 154(b) by 0 days.

(21) Appl. No.: 15/739,759

(22) PCT Filed: Apr. 12, 2016

(86) PCT No.: PCT/CN2016/079032
§ 371 (c)(1),
(2) Date: Dec. 25, 2017

(87) PCT Pub. No.: WO2016/177253
PCT Pub. Date: Nov. 10, 2016

(65) Prior Publication Data
US 2018/0178579 A1    Jun. 28, 2018

(30) Foreign Application Priority Data

May 1, 2015   (CN) .......................... 2015 1 0216106
May 12, 2015  (CN) .......................... 2015 1 0236711

(51) Int. Cl.
*B42D 25/405*   (2014.01)
*G06K 9/00*     (2006.01)
(Continued)

(52) U.S. Cl.
CPC ............. *B42D 25/405* (2014.10); *B41M 3/14* (2013.01); *B42D 25/30* (2014.10); *G06K 9/00* (2013.01);
(Continued)

(58) Field of Classification Search
CPC ...................................................... B42D 25/405
(Continued)

(56) References Cited

U.S. PATENT DOCUMENTS

2013/0239828 A1*  9/2013  Chen .................... G09F 3/00
                                                         101/31

FOREIGN PATENT DOCUMENTS

CN         1074563 C        11/2001
CN         2476070 Y        2/2002
(Continued)

OTHER PUBLICATIONS

International Search Report of PCT Patent Application No. PCT/CN2016/079032 dated Jul. 1, 2016.
(Continued)

*Primary Examiner* — Jacky X Zheng

(57) ABSTRACT

Disclosed are an ink edge anti-counterfeiting method and an ink edge anti-counterfeiting network identification system. Tiny sawteeth (6) are randomly produced on ink edges of a product code (4) and/or an image-text and the sawteeth (6) are zoomed in on and photographed, feature information about the sawteeth (6) on the ink edges acquired through photographing is stored in an ink edge anti-counterfeiting network identification system database as anti-counterfeiting feature information, and sawtooth feature information to
(Continued)

be checked is compared with the sawtooth feature information in the database to identify the authenticity. The method and system are simple and easy to implement, do not need to increase equipment investment, can realize an effective anti-counterfeiting function, and can avoid the problem in the existing digital anti-counterfeiting techniques, such as a telegram code, that the anti-counterfeiting feature information can be easily copied and stolen by internal staff.

23 Claims, 12 Drawing Sheets

(51) Int. Cl.
    *G06Q 30/00*     (2012.01)
    *G09F 3/00*     (2006.01)
    *B42D 25/30*     (2014.01)
    *B41M 3/14*     (2006.01)

(52) U.S. Cl.
    CPC ......... *G06K 9/00577* (2013.01); *G06Q 30/00* (2013.01); *G09F 3/00* (2013.01); *G06K 2009/0059* (2013.01)

(58) Field of Classification Search
    USPC ........................................................ 358/1.15
    See application file for complete search history.

(56) References Cited

FOREIGN PATENT DOCUMENTS

| | | |
|---|---|---|
| CN | 202563817 U | 11/2012 |
| CN | 104794629 A | 7/2015 |
| CN | 104992209 A | 10/2015 |
| CN | 204833342 U | 12/2015 |

OTHER PUBLICATIONS

Mingchao Ren, National Code Anti-Counterfeiting Promotion Action Ended Silently, China Youth News, Economy Issue, Jun. 4, 2009.

\* cited by examiner

INK EDGE ANTI-COUNTERFEITING METHOD AND INK EDGE ANTI-COUNTERFEITING NETWORK VERIFICATION SYSTEM

BACKGROUND OF THE INVENTION

Technical Field

The invention belongs to the technical field of printing anti-counterfeiting, and specifically relates to an ink edge (namely the edge of the printing ink) anti-counterfeiting method and an ink edge anti-counterfeiting network verification system. The anti-counterfeiting method and the verification system drive the (ink) edges of codes and/or image-texts to generate random micro-deformations to form random ink edge characteristics such as individual saw tooth edges which are difficult to duplicate.

Description of Related Art

In the anti-counterfeiting industry, the three internationally acknowledged factors of an anti-counterfeiting technology include: 1. difficulties in counterfeiting; 2. easy identification; 3. long-term effectiveness. For hundreds of years, thousands of people engaged in anti-counterfeiting technologies have researched, developed, produced and promoted numerous anti-counterfeiting technical products on the basis of those three factors. The three factors, namely difficulties in counterfeiting, easy identification and long-term effectiveness, have become the internationally agreed criteria for testing the quality of the anti-counterfeiting technical products in the anti-counterfeit industry.

The Chinese utility model (CN202563817U) authorized a "dynamic colored-coded anti-counterfeiting label", wherein 10-21 anti-counterfeiting digital Arabic characters were designed into colored characters that change randomly to increase the difficulties in duplication and counterfeiting. During search and verification, only when data that is identical and the color of every one of the characters is consistent with the corresponding character colors that is recorded and registered in the database of an anti-counterfeiting network verification system, can a label be judged to be true.

The Chinese utility model (CN2476070Y) authorized a "graphical password anti-counterfeiting label", wherein the anti-counterfeiting label was printed with some random patterns to increase difficulties in duplication and anti-counterfeiting. During search and verification, only when the data is identical and every one of the patterns is consistent with the corresponding characteristic patterns that is recorded and registered in the database of an anti-counterfeiting network verification system, can a label be judged to be true.

China Youth News devoted a full page to the article— National Code Anti-Counterfeiting Promotion Action Ended Silently on the Economy Issue on Jun. 4, 2009. The article pointed out the four major loopholes of the code anti-counterfeiting, wherein the third one is batch counterfeiting with fake codes: "passwords can be acquired by various means, for example, it is possible that counterfeiting groups exchange money with codes from workers of a company, or hire talented hackers to break into the database of the anti-counterfeiting network verification system from the Internet and copy a large amount of anti-counterfeiting data (anti-counterfeiting characteristics information) to make numerous counterfeit products. Here, it should be pointed out that the absolute security of the database of the anti-counterfeiting network verification system is the precondition of the digital anti-counterfeiting, and once data leaks, the anti-counterfeiting system engineering will fall apart completely. It is known that the security of the Internet has increasingly become an important concern. Negligence of the management link of a company, scanning passwords by using a hi-tech penetration instrument, etc., are also possible methods for acquiring codes." In conclusion, the third loophole of the existing code anti-counterfeiting technology is accessible to a domestic thief. Once internal workers copy the anti-counterfeiting characteristics information that is registered in the database and sells the copied information to counterfeiters, batch counterfeit products can be made and can pass the anti-counterfeiting verification.

In a word, the existing digital anti-counterfeiting technologies such as codes have a common loophole-failure to resist a domestic thief. The reason is that, the anti-counterfeiting characteristics information of the anti-counterfeiting characteristics such as random digital codes, character colors and random patterns on the existing code anti-counterfeiting labels are obtained by printing the anti-counterfeiting characteristics information documents in a computer and then printing and outputting printing ink distribution characteristics by using a digital printer in advance. In this way, internal workers or network hackers can print and output identical printing ink distribution characteristics by copying and stealing the original anti-counterfeiting characteristics information such as random digital codes, character colors, and random patterns.

In other words, the anti-counterfeiting characteristics of the existing code anti-counterfeiting labels all come from the pre-designed original anti-counterfeiting characteristics information, are printed and output results of the original anti-counterfeiting characteristics information, and can be duplicated and counterfeited as long as the original anti-counterfeiting characteristics information is copied and stolen. However, for the purpose of printing and production and the purpose of searching and anti-counterfeit verification, the original anti-counterfeiting characteristics information of the characteristics such as random digital codes, character colors and random patterns will inevitably be handled among relevant workers and completely stored in the database of the anti-counterfeiting network verification system. In this way, internal workers or hackers undoubtedly have the opportunities of copying and stealing the original anti-counterfeiting characteristics information. Therefore, the existing code anti-counterfeiting technologies inevitably have the third loophole-"failure to resist a domestic thief".

BRIEF SUMMARY OF THE INVENTION

The technical problem to be solved by the embodiments of the invention is to provide an ink edge anti-counterfeiting method and an ink edge anti-counterfeiting network verification system to overcome the defect of the existing anti-counterfeiting technologies where thieves can make counterfeit products by stealing the anti-counterfeiting characteristics information, and to simply and easily block the loophole-"failure to resist a domestic thief" of the existing anti-counterfeiting technologies.

To solve the above mentioned problems, the invention provides an ink edge anti-counterfeiting method, comprising the steps of:

(a) printing an anti-counterfeiting portion with a randomly generated saw tooth edge (6) on a printing material (2) to be anti-counterfeited, wherein the anti-counterfeiting portion includes a preset code (4) and/or an image-text (5);

(b) limiting the sizes of some single saw teeth (it is not required to limit all single saw teeth) on the saw tooth edge (6) within certain preset ranges [such that the ink edge (namely tiny saw teeth which are invisible to the naked eyes) looks in order when the saw tooth edge (6) is observed with the naked eye], photographing the saw teeth by a magnifying power which is not smaller than a preset magnifying power, wherein some single saw teeth on the saw tooth edge (6) on a photographed picture can be observed by a user with the naked eye;

(c) wherein in preset size ranges of some single saw teeth (it is not required to limit all the single saw teeth), the maximum height is 0.3 mm (the width W is best in the range of 0.03-1 mm), and the minimum height is 0.03 mm (the width W is best in the range of 0.03-1 mm);

(d) photographing the saw teeth by a magnifying power which is not smaller than the preset magnifying power, (photographing) acquiring the saw tooth characteristics information on the saw tooth edge (6), storing the acquired saw tooth characteristics information file in the database of an ink edge anti-counterfeiting network verification system in a way of corresponding to the information of the code (4); or storing the generated electronic file (13) with the individual saw tooth edge (6) and/or mark as saw tooth characteristics information in the database of the ink edge anti-counterfeiting network verification system;

(e) receiving the information of the to-be-verified code (4) and/or the to-be-detected saw tooth characteristics information on the to-be-verified printing material (2) that is sent from a camera phone of a user, comparing the to-be-detected saw tooth characteristics information with a corresponding saw tooth characteristics information file and verifying the to-be-detected saw tooth characteristics information in the database server terminal or the camera phone terminal, and displaying verification conclusion information [regarding the truth of the printing material (2)] on the screen of the camera phone;

or, logging in to the database website of the ink edge anti-counterfeiting network verification system on a computer which is accessed by the Internet by the user, keying in the code (4), browsing (namely retrieving) a corresponding saw tooth characteristics picture (8), magnifying the picture and observing if the to-be-detected saw tooth characteristics are consistent with the saw tooth characteristics in the browsed saw tooth characteristics picture (8) (magnifying and observing the characteristics by using the camera phone or a magnifying lens or other magnifying tools), and then verifying if the printing material (2) is real or not (namely making manual self-observation, verification and judgment).

The invention also provides an ink edge anti-counterfeiting network verification system, including:

a database, wherein the database stores the saw tooth characteristics information file of the printing material (2) and the file of the association relationship between the saw tooth characteristics information file and the information of a code (4); the printing material (2) is printed with an anti-counterfeiting portion with a randomly generated saw tooth edge (6); the anti-counterfeiting portion includes a preset code (4) and/or an image-text (5); some single saw teeth on the saw tooth edge (6) are within preset size ranges and after being photographed by a magnifying power which is not smaller than a preset magnifying power, are capable of being seen by users with the naked eye on the photographed picture; the saw tooth characteristics information file is obtained by photographing the anti-counterfeiting portion by a magnifying power which is not smaller than the preset magnifying power, wherein some single saw teeth are within the preset size ranges in which the maximum height is smaller than or equal to 0.3 mm, the width is preferably smaller than or equal to 1 mm, the minimum height is greater than or equal to 0.03 mm, and the width is preferably smaller than or equal to 1 mm;

a communication unit for receiving the information of the to-be-verified code (4) of the to-be-verified printing material (2) and/or the saw tooth characteristics information file that is sent from the camera phone of the user;

a verification processing unit for searching the saw tooth characteristics information file which is associated with the information of the to-be-verified code (4) in the database in accordance with the information of the to-be-verified code (4), and carrying out anti-counterfeiting verification on the anti-counterfeiting portion of the printing material (2) according to the searched saw tooth characteristics information file.

Compared with the prior art, the invention has at least the following beneficial effects:

1) Huge difficulties in duplication: the individual saw tooth edge (6) of the code (4) and/or the image-text (5) is an individual ink edge characteristic formed after the printing ink (3) is printed on the printing material (2) and then generates micro-deformation randomly. Through researching, the inventor found that when the code (4) and/or the image-text (5) printed by various printing processes such as ink jet printing was observed with a magnifying lens, the ink edge was not smooth and straight, but always generated some irregular saw teeth caused by printing ink diffusion, etc. In other words, the individual saw tooth edge (6) is generated through missing or diffusion or coasting deformation or scrapping of the printing ink, and the individual saw tooth edge (6) does not exist on the printing plate (including printed materials), and is an individual ink edge characteristic which only appears after the printing. Even if a "domestic thief" copies the true anti-counterfeiting code, copies the anti-counterfeiting characteristics information, and even copies the high-resolution pictures of the individual saw tooth edge (6), the ink edges of the codes (4) and/or image-texts (5) of the printed counterfeit products randomly re-generate micro-deformations which are different from the anti-counterfeiting characteristics information in the database.

The inventor made the following experiments: the simplest number "1" was printed 100 times on a piece of unsized invoice paper (paper with extremely high diffusion) by using a water-based ink-jet printer, No. 3 font, and Song typeface. Then, a camera phone was utilized as a magnifying lens to observe the number "1", and it was found that the ink edges of the 100 units of "1" all varied with tiny saw teeth. In other words, according to the observation results obtained by using a mobile phone as the magnifying lens, no one can duplicate the "1" of which the tiny saw teeth are completely identical. In conclusion, the invention initially applies the magnified pictures of the randomly generated individual saw tooth edges (6) for anti-counterfeiting. The randomly generated individual saw tooth edge (6) has the characteristics of being difficult to duplicate and counterfeit. Therefore, the invention utilizes a simpler and easier method to block the anti-counterfeiting technical loophole—"being susceptible to a domestic thief" of the existing digital anti-counterfeiting technologies. This beneficial effect completely meets the first factor, namely difficulties in counterfeiting, of the three anti-counterfeiting factors.

2) Easy identification: QR code scanning software such as WeChat Scan, QQ Scan, Wochacha Scan, Baidu Scan, Taobao Scan, etc., of the existing camera phones can all call up the saw tooth characteristics pictures (8) of the code (4)

and/or the image-text (5). Users can utilize the magnifying lens function of the camera phones to check the micro-saw tooth of the ink edge of the printing material (2) to verify whether the printing material (2) is real or not. This beneficial effect completely meets the second factor, namely easy identification, of the three anti-counterfeiting factors.

3) After downloading the special anti-counterfeiting inquiry APP developed by using the invention, users can use the camera phones to scan the code (4) and/or the image-text (5) to automatically verify if the individual saw tooth edge (6) is consistent, then facilitating true-or-false verification.

4) Very simple implementation: for example, if existing electronic medicine monitoring codes (4) are printed by using the anti-counterfeiting technology of the invention, it is only needed to keep the magnified (high-definition) pictures of electronic medicine monitoring codes (4) and their individual saw tooth edges (6) and save the pictures in the database of the ink edge anti-counterfeiting network verification system when the medicines are tested by using a quality tester. In other words, without increasing investment in equipment and cost, adding procedures and reducing the print quality of the code (4) and/or the image-text (5), the invention endows products such as electronic medicine monitoring codes (4) with an anti-counterfeiting function and blocks the loophole—"being susceptible to a domestic thief" of the existing digital anti-counterfeiting technologies such as codes.

5) Easy magnifying and identification, and high practicability: users can use the camera function of the mobile phones to take a picture of the code (4) and/or the image-text (5) on a piece of printing material (2) by using the micro-distance mode, then magnify the picture, observing if the individual saw tooth edge (6) is consistent with the retrieved (browsed) saw tooth characteristics picture (8) to verify if the printing material (2) is real or not, without using a special magnifying lens. In other words, the magnifying lens by which the individual saw tooth edge (6) of the invention can be clearly observed exists in the existing camera phones, and users do not need to purchase a special magnifying lens. In other words, users can easily carry out the anti-counterfeit verification by adopting the product of the invention, and the technology of the invention is very practical.

6) The invention particularly has an inventive step in the selection of the technical parameters: the size of a single saw tooth: 0.3 mm(H)×0.3 mm(W)≥S≥0.03 mm(H)×0.03 mm(W). A saw tooth with this size S is the minimum (object) size that current mainstream mobile phones (with a lens resolution ratio of ≥8 million pixels) can handle. This size was selected as the saw tooth standard of the individual saw tooth edge (6) to meet the urgent needs of users to verify if a product is real or not. In other words, the selected size, 0.3 mm (H)≥S≥0.03 mm(H), of a single saw tooth is a technical support by which users can use their camera phones to verify if a product is real or not. On the contrary, if the size S of a single saw tooth is smaller than 0.03 mm(H), it is difficult for users to verify if a product is real or not by using the camera phone, so the objective of the invention cannot be achieved. The invention meets the users' demands of verifying if a product is real or not, so the invention belongs to public anti-counterfeiting instead of expert anti-counterfeiting.

7) Long-term effectiveness: in conclusion, the invention provides long-term effective anti-counterfeiting technology because the individual saw tooth edge (6) is very difficult (hardly) to duplicate and easily identified. This beneficial effect completely meets the third factor, namely long-term effectiveness, of the three anti-counterfeiting factors.

Figure 1:
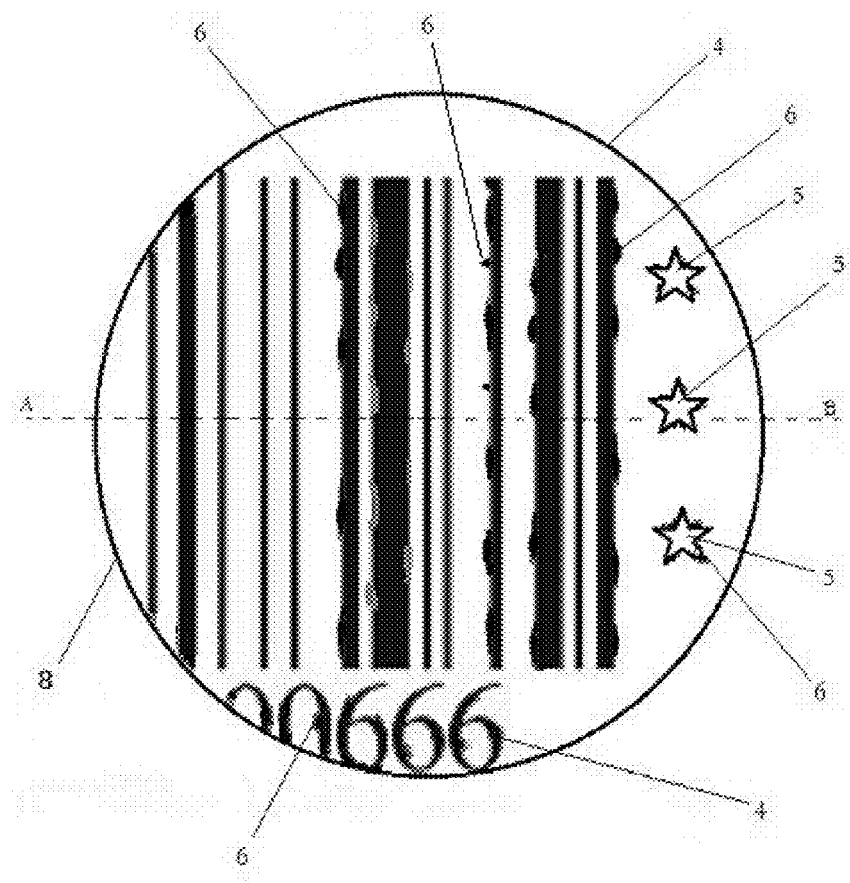
FIG. 1 is a partially enlarged schematic view of an electronic medicine monitoring code in an embodiment of the invention.
Figure 2:
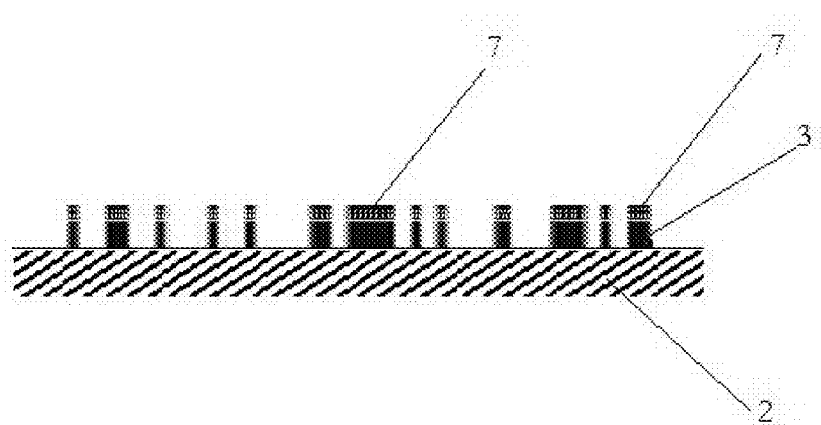
FIG. 2 is a structural view of a cross section at a position A-B in FIG. 1.
Figure 3:
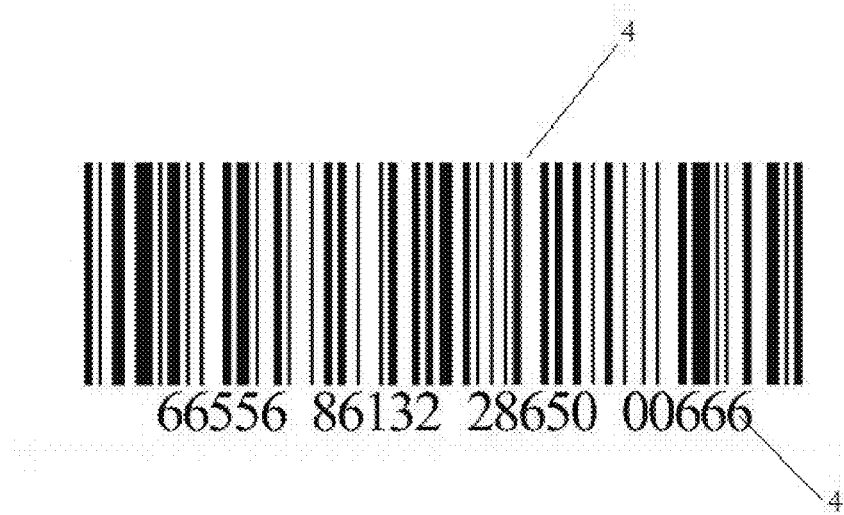
FIG. 3 is a schematic view of an existing electronic medicine monitoring code (without saw tooth edge)
Figure 4:
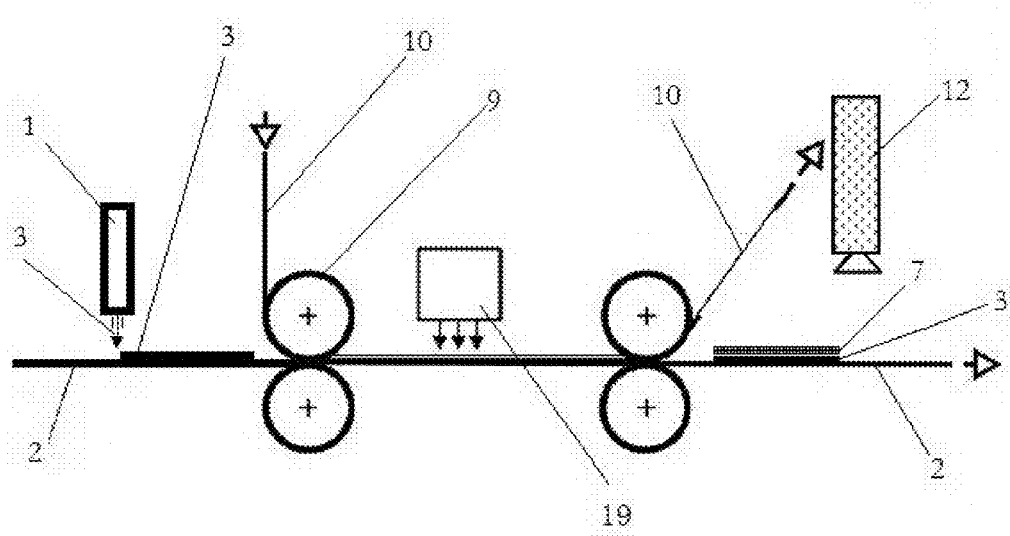
FIG. 4 is a schematic view of a process flow of a code or image-text (with a saw tooth edge and a transfer layer) in an embodiment of the invention.

Description of marks in the drawings: 1—printer; 2—printing material; 3—printing ink; 4—code; 5—image-text; 6—(individual) saw tooth edge; 7—transfer layer; 8—saw tooth characteristics picture; 9—compression roller; 10—(cold or hot) wave membrane; 11—strong wing; 12—digital camera; 13—electronic file; 14—interfering strip; 15—simulating picture; 16—micro-damage trace; 17—pill; 18—to-be-detected picture; 19—drying lamp; 20—recession; 21—lattice point or single ink dot; 22—white spot (defects); 23—code.

DETAILED DESCRIPTION OF THE INVENTION

In order to clarify the technical problems to be solved, the technical solution and the advantage of the invention, the invention is described in detail below in conjunction with the attached drawings and specific embodiments.

In this embodiment, the invention provides an ink edge anti-counterfeiting method, including the steps of: first, printing an anti-counterfeiting portion with a randomly generated saw tooth edge (6) on a printing material (2) to be anti-counterfeited, wherein the anti-counterfeiting portion includes a preset code (4) and/or an image-text (5), some single saw teeth on the saw tooth edge (6) are within preset size ranges and after being photographed by a magnifying power which is not smaller than a preset magnifying power, are capable of being seen with the naked eye;

second, photographing the saw teeth by a power which is not smaller than the preset magnifying power, acquiring the saw tooth characteristics information of the anti-counterfeiting portion and the information of a code (4) for exclusively marking a printing material (2), establishing a saw tooth characteristics information file and a file of association relationship between the saw tooth characteristics information and the information of the code (4), and storing the files in the database of an anti-counterfeiting network verification system;

third, receiving the information of the to-be-verified code (4) and/or to-be-detected saw tooth characteristics information on the to-be-verified printing material (2) that is sent from a camera phone of a user;

fourth, in accordance with the information of the to-be-verified code (4), searching the saw tooth characteristics information file which is associated with the information of the to-be-verified code (4) in the database, and carrying out anti-counterfeiting verification on the to-be-detected saw tooth characteristics information according to the searched saw tooth characteristics information file at the database sever terminal, or downloading the searched saw tooth characteristics information file at the camera phone, and carrying out the anti-counterfeiting verification on the to-be-detected saw tooth characteristics information according to the searched saw tooth characteristics information file.

Wherein some (namely a part of the saw teeth, instead of all saw teeth) single saw teeth are within preset size ranges in which the maximum height is smaller than or equal to 0.3 mm, the width is better smaller than or equal to 1 mm, the minimum height is greater than or equal to 0.03 mm, and the width is better smaller than or equal to 1 mm.

In this embodiment, the user terminal can be connected to the database of the ink edge anti-counterfeiting network verification system through networks to carry out true-or-false verification. For example, the user terminal can be connected to the database through a mobile network (3G/4G/LTE network, WLAN network) or a cabled network (such as ADSL, local area network, etc.), and upload the information of the to-be-verified code (4) and/or the to-be-detected saw tooth characteristics information that is photographed by a magnifying power by the terminal (for example camera phone) of the user to carry out true-or-false verification.

From the above-mentioned examples, it can be seen that, according to the ink edge anti-counterfeiting method provided by the invention in this embodiment, the saw teeth of the ink edges of the product code and image-text (5) are photographed by a magnifying power, and the photographed saw tooth characteristics information is stored as anti-counterfeiting characteristics information in the database of the ink edge anti-counterfeiting verification system for the subsequent comparison and verification of the to-be-detected saw tooth characteristics information which is obtained by the camera phone. This embodiment of the invention has the advantage of simple and easy implementation, does not increase investment in equipment, has little influence on the procedures and cost of the existing print process, can endow products with an effective anti-counterfeiting function and can avoid the problem of "failure to resist a domestic thief" of the digital anti-counterfeiting technologies such as codes. At the same time, users can very conveniently obtain the information of the to-be-verified code (4) on the to-be-verified printing material (2) and/or the to-be-detected saw tooth characteristics information by using the widely used camera phones, so this verification method is very easy to use and practicable and meets the verification demands of common users.

Considering the common vision of the users, in this embodiment of the invention, some single saw teeth are set to be within the preset size ranges in which the maximum height is smaller than or equal to 0.3 mm, the width is 0.3-1 mm, the minim height of greater than or equal to 0.03 mm, and the width is 0.03-1 mm. Even if the saw tooth edge (6) includes some smaller invisible saw teeth, the verification conclusion is not affected.

In conclusion, the invisible saw teeth can be excluded from serving as the basis for the anti-counterfeiting verification, and bigger visible saw teeth are allowed to exist as long as the bigger visible saw teeth do not affect the appearance and quality.

In the embodiments of the invention, the anti-counterfeiting portion with the randomly generated saw tooth edge (6) can be printed by adopting one or a combination of more of the following printing methods to generate the required individual saw tooth edge (6).

Printing method 1, including the steps of: printing a code (4) and/or an image-text (5) on a printing material (2), extruding, for example rolling by a compression roller (9), or air blowing or scrapping the undried printing ink (3) which forms the code (4) and/or the image-text (5) in the time period from the end of printing to the beginning of drying, using an external force to drive the ink edge of the code (4) and/or the image-text (5) to generate random diffusion and micro-deformation so as to form an individual saw tooth edge (6).

Printing method 2, including the steps of: enhancing the leveling property of printing ink (3) and/or drying the undried printing ink (3) in a time-delayed way (for example drying with a time delay of 0.1-10 s) after printing to increase the diffusion and deformation amplitude of the ink edge of a code (4) and/or an image-text (5) so as to form an individual saw tooth edge (6).

Here, the delayed drying refers to prolonging the period of time from the end of the printing to the beginning of the drying as long as possible (for example, prolonging the distance from a jet nozzle to a drying lamp as long as possible) such that the printing ink (3) has enough time to fully diffuse (seep and spread), thus generating obvious micro-deformations.

In this embodiment of the invention, the printing method of adopting the delayed drying and driving the undried printing ink (3) to diffuse and deform to generate the individual saw tooth edge (6) disobeys the existing technical standard for the ink-jet printing process. According to the existing technical standard for the ink-jet printing process, drying is required immediately after ink jetting to prevent the undried electronic printing ink (3) from diffusing and deforming. Therefore, the distance from the jet nozzle to the drying lamp is required to be as short as possible, namely ≤150 mm, according to the existing technical standard for ink-jet printing process. Through research, the inventor found that only when the distance from the jet nozzle to the drying lamp (19) is greater than or equal to 170 mm (for example, the distance is set to be 500 mm or 800 mm) can the individual saw tooth edges (6) which can be handled with the phone cameras with common pixels be generated. Or, the drying time is greater than or equal to 0.1 s (for example the drying time is set to be 1 s, 60 s, 3 h, or 8 h) within the time period from the moment when the printing ink (3) is printed to the moment when the printing ink is completely cured. In this way, the electronic printing ink (3) can fully diffuse, seep and spread in the process of getting dried slowly, thus generating a required individual saw tooth edge (6).

Printing method 3, including the steps of: pre-printing a diffusant coating at a position of a code (4) and/or an image-text (5) on a printing material (2), then printing the code (4) and/or the image-text (5) on the diffusant coating, driving the undried printing ink (3) to speed up diffusing or shrinking to form an individual saw tooth edge (6). Here, when the surface tension of the diffusant coating is greater than the surface tension of the printing ink (3), the printing ink (3) has a forward diffusion property and therefore diffuses outward; when the surface tension of the diffusant coating is smaller than the surface tension of the printing ink (3), the printing ink (3) has a reverse diffusion property and therefore shrinks inward.

Printing method 4, including the steps of: printing a code (4) and/or an image-text (5) on an uneven printing material (2), and driving the code (4) and/or the image-text (5) to generate random fragmentary micro-deformation in virtue of the characteristics of unevenness and no-uniform adhesion of the printing face to form an individual saw tooth edge (6).

Here, a plated printer (1) or a rubber fabric transfer digital printer (1) can be adopted to print the code (4) and/or the image-text (5) on the printing material (2) with an uneven printed face, to form the individual saw tooth edge (6).

Printing method 5, including the steps of: jet printing a code (4) and/or an image-text (5) on a printing material (2), applying a cold wave membrane (10) onto the electronic printing ink (3) (namely electronic glue) which forms the code (4) and/or the image-text (5) in the time period from the end of printing to the beginning of drying, and pressing the membrane with a compression roller (9); drying the code (4) and/or the image-text (5) and tearing off the cold wave membrane (10) to transfer a part of a transfer layer (7) on the cold wave membrane (10) onto the code (4) and/or the image-text (5) such that the code (4) and/or the image-text (5) forms an individual saw tooth edge (6) with a clear profile.

Here, when the printing method 1 or printing method 5 is adopted to print the anti-counterfeiting portion with the randomly generated saw tooth edge (6), the compression roller (9) has an uneven roller face to form a more obvious saw tooth edge (6).

Printing method 6, including the steps of: hot printing a code (4) and/or an image-text (5) on a (for example, uneven) printing material (2) by using a hot wave membrane (10) such that the code (4) and/or the image-text (5) forms an individual saw tooth edge (6) with a clear profile.

Printing method 7, comprising the steps of: generating an electronic file (13) with an individual saw tooth edge (6) and/or marks [concerning a code (4) and/or an image-text (5)], printing the electronic file (13) on a printing material (2), thus printing an individual saw tooth edge (6) and/or marks.

What can be obtained is that, numerous single saw teeth on the individual saw tooth edge (6) that are printed by adopting the printing method 7 are arrayed to form a (binary) code (23) which represents certain meanings, for example the product code for representing the anti-counterfeiting object, product bar-code, user enterprise code, etc.

Here, before the electronic file (13) is deleted, the electronic file can also be added with interfering strips which are formed on the anti-counterfeiting portion to obtain a simulating picture (15) of the anti-counterfeiting portion, wherein the simulating picture is a saw tooth characteristics picture (8).

Printing method 8, including the steps of: when a printing material (2) is aluminum plastic blister packaging material, jet printing a code (4) onto the aluminum plastic blister packaging material, hot pressing and sealing the aluminum plastic blister packaging material such that an image-text (5) is randomly damaged to form an individual saw tooth edge (6). Here, when the printing material (2) is a packing material such as an aluminum plastic blister packaging material, the anti-counterfeiting characteristics information is the information of a micro-damage trace (16) on the code (4) and/or the image-text (5) on the aluminum plastic blister packaging material.

Printing method 9, including the steps of: jetting one or more ink dots (21) onto a printing material (2) by using an ink-jet printer (1), wherein the ink dots (21) splash to deform, and the ink dots (21) are arrayed to form a code (4), thus forming an individual saw tooth edge (6).

In the above printing method, when the anti-counterfeiting portion with the randomly generated saw tooth edge (6) is printed, the electronic printing ink (3) which is added with a flattening agent is further adopted to jet ink and print the code (4) and/or the image-text (5) on a printing material (2), or a transparent flattening protective layer is further applied onto a transfer layer (7) of the code (4) and/or the image-text (5).

Printing method 10, including the steps of: drying undried printing ink (3) with a time delay of 0.01-10 s (namely drying and curing the printing ink after waiting for 0.01-10 s) after printing to increase the diffusion and deformation amplitude of the ink edge of a code (4) and/or an image-text (5) to form an individual saw tooth edge (6).

Printing method 11, including the steps of: adding 0.5-5% of retarder into printing ink (3) to increase the diffusion and deformation amplitude of the ink edge of a code (4) and/or an image-text (5) to form an individual saw tooth edge (6). The retarder is a chemical product which can restrain and slow down the drying of the printing ink. This chemical product can prevent the printing ink from drying on the printing plate or an anilox roller, and reduce printing faults such as printing blockage and scumming.

Printing method 12, including the steps of: printing a code (4) and/or an image-text (5) on a printing material (2), applying a membrane onto the printing material (2) and undried printing ink (3), rolling the membrane first and then drying the printing ink such that the ink edge of the code (4) and/or the image-text (5) form an individual saw tooth edge (6) along the rolling trajectory.

Printing method 13, including the steps of: selecting slack sized paper with a sizing degree of 0.25-0.75 mm or unsized paper (such as blotting paper) as a printing material (2), printing a code (4) and/or an image-text (5) on the printing material (2) to increase the diffusion and deformation amplitude of the ink edge of the code (4) and/or the image-text (5) to form an individual saw tooth edge (6). Drawing paper and typing paper are slack sized paper with a sizing degree of 0.25-0.75 mm, while news paper, cigarette paper, filter paper and blotting paper are unsized paper without sizing degree. The above 13 printing methods merely illustrate the printing methods that can be adopted in the embodiments of the invention, but the invention is not limited to the above 13 printing methods.

Considering the storage capacitance of the database and the clear degree of the saw tooth characteristics picture (8), if the magnifying power n (namely the preset magnifying power) which is adopted to take pictures is too small, it is very difficult for users to see the individual saw tooth edge (6) clearly on the terminal (for example camera phone) of the users; if the magnifying power n is too large, the storage space of the database and the data traffic of the mobile phone are wasted, resulting in unnecessary waste. Through researching the display situations of common user terminals, the inventor found that it was proper to set the standard that some single saw teeth with sizes S within the above mentioned ranges could be seen clearly on the saw tooth characteristics picture (8) which was photographed by taking the magnifying power n (preset magnifying power), downloaded by and displayed on a camera phone (for example iPhone 5s) with a screen size of ≥4 inches and a screen resolution of ≥1136×640 pixels. Further research showed that, in accordance with this standard, after the saw tooth characteristics picture (8) which was photographed by the magnifying power n, downloaded by and displayed on the camera phone with a screen size of ≥4 inches and a screen resolution of ≥1136×640 pixels, pulp fibers on the paper type printing material (2) cannot be clearly seen because the magnifying power n is not large enough, so the true-or false verification cannot be carried out according to the distribution characteristics of the pulp fibers on the paper.

After establishing the anti-counterfeiting database, in this embodiment of the invention, the saw tooth characteristics picture (8) saved in the anti-counterfeiting database can be used to carry out the anti-counterfeiting verification. In this circumstance, the above method can also include receiving the to-be-detected saw tooth characteristics information such as the information of the to-be-verified code (4) and/or on the to-be-verified printing material (2) or the to-be-detected picture (18) that is sent from the camera phone of the user. Here, the to-be-detected picture (18) records the to-be-detected saw tooth characteristics information. The to-be-detected picture (18) is photographed by using a camera terminal (for example the camera phone) with a lens resolution of ≥8 million pixels at a micro-distance of smaller than 290 mm to a photographed object; according to the information of the to-be-verified code (4), saw tooth characteristics information files such as the saw tooth characteristics picture (8) that are associated with the information of the to-be-verified code (4) are found in the anti-counterfeiting database, and the information of the to-be-detected saw tooth characteristics information such as the to-be-detected picture (18) can be verified according to the searched saw tooth characteristics information files.

In the embodiments of the invention, one or more of the following verification methods can be adopted to carry out the anti-counterfeiting verification on the to-be-verified object.

Verification method 1, including the steps of: scanning a code (4) on a printing material (2) by using a camera phone, calling up a saw tooth characteristics picture (8) from the database according to the information of the code (4), wherein the picture is a picture of a file; selecting a camera phone with a lens resolution of ≥8 million pixels as a magnifying lens, moving the mobile phone lens to a position at a distance of smaller than 290 mm away from the code (4) and/or an image-text (5), magnifying an individual saw tooth edge (6) on the printing material (2), observing if the magnified individual saw tooth edge (6) is identical with the individual saw tooth edge (6) on the picture of the file, and then making a true-or-false judgment. Here, the magnified observation can be a situation where the saw tooth edge (6) on the printing material (2) is directly observed with the camera of the mobile phone, or a situation where the saw tooth edge (6) on the printing material (2) is photographed and then the saw tooth edge (6) on the picture of the printing material (2) is magnified and observed.

Verification method 2, including the steps of: photographing a code (4) and/or an image-text (5) on a printing material (2) by using a camera phone with a lens resolution of ≥8 million pixels to acquire the information of the code (4) and to-be-detected picture (18) of an individual saw tooth edge (6); then, calling up a saw tooth characteristics picture (8) from the database according to the acquired information of the code (4), wherein the picture is a picture of a file; displaying the to-be-detected picture (18) and the picture of the file on the screen of the mobile phone; next, observing if the individual saw tooth edge (6) on the to-be-detected picture (18) is identical with the individual saw tooth edge (6) on the picture of the file with the naked eye, and making a true-or-false judgment.

Verification method 3, including the steps of: photographing a code (4) and/or an image-text (5) on a printing material (2) by using a camera phone with a lens resolution of ≥8 million pixels to acquire the information of the code (4) and the to-be-detected picture (18) of an individual saw tooth edge (6), then uploading the to-be-detected picture (18) to the ink edge anti-counterfeiting network verification system to verify the pictures; if the code (4) is consistent, feeding back the information of a primary verification conclusion and the link of a final verification conclusion to the camera phone of the user; in the period of time before the link of the final verification conclusion is opened by the user, accurately analyzing and verifying the to-be-detected picture (18) and the picture of the file, making the final verification conclusion by the anti-counterfeiting network verification system, waiting for the user to open the link, acquiring the final conclusion; and if the code (4) is inconsistent, feeding back the verification conclusion that a product is a counterfeit product to the camera phone of the user.

Verification method 4: In this embodiment of the invention, the auxiliary anti-counterfeiting certification information can be used to carry out auxiliary anti-counterfeiting certification, wherein specifically:

in this embodiment of the invention, when the saw tooth characteristics picture (8) is photographed, some quality defects (such as dust/stains/white spots/breakage/burrs/tails/scumming, etc.) including (tiny) marks on a code (4) and/or an image-text (5) can be further acquired as auxiliary anti-counterfeiting characteristics information files, and the auxiliary anti-counterfeiting characteristics information file and the saw tooth characteristics information file are stored in the database in a way of corresponding to the information of the code (4); and during the anti-counterfeiting verification, the to-be-detected auxiliary anti-counterfeiting characteristics information and the to-be-detected saw tooth characteristics information are compared with the auxiliary anti-counterfeiting characteristics information file and the saw tooth characteristics information file for verification.

Verification method 5, comprising the steps of: selecting a camera phone with a lens resolution of ≥8 million pixels to photograph a code (4) and/or an image-text (5) on a printing material (2) by a magnifying power at a micro-distance of smaller than 290 mm away from the code and/or image-text, uploading the photographed to-be-detected saw tooth characteristics information on the saw tooth edge (6) together with the information of the code (4) into the database, comparing the photographed to-be-detected saw tooth characteristics information on the saw tooth edge (6) with the saw tooth characteristics information file and verifying the to-be-detected saw tooth characteristics information by an ink edge anti-counterfeiting network verification system, and feeding back the verification conclusion to the camera phone.

In this embodiment of the invention, when the printing method 5 is adopted to print the anti-counterfeiting portion with a randomly generated saw tooth edge (6); the transfer layer (7) on the cold wave membrane (10) has random distribution characteristics information; the random distribution characteristics information includes at least one of the following characteristics information: the transfer layer (7) is pre-molded with a laser image-text; the transfer layer (7) is pre-printed with a colorful image-text; and, the transfer layer (7) is pre-mixed with fine powder randomly. In such circumstance, in this embodiment of the invention, the random distribution characteristics information can be used as auxiliary anti-counterfeiting certification information to assist with the anti-counterfeiting certification. Details are as follows.

In this embodiment of the invention, when the saw tooth characteristics picture (8) is photographed, the random distribution characteristics information on the transfer layer (7) on the code (4) and/or the image text (5) can be further acquired and stored as primary auxiliary anti-counterfeiting characteristics information in the database, a primary auxiliary anti-counterfeiting characteristics information file and a file of association relationship between the primary auxiliary anti-counterfeiting characteristics information file and the information of the code (4) are established and stored in the database.

During the anti-counterfeiting verification, in accordance with the information of the to-be-verified code (4) of the to-be-verified printing material (2), the saw tooth characteristics information file and the primary auxiliary anti-counterfeiting characteristics information file that are associated with the information of the to-be-verified code (4) are searched in the database, and the anti-counterfeiting verification is carried out on the basis of the searched saw tooth characteristics information file and the primary auxiliary anti-counterfeiting characteristics information file.

In this embodiment of the invention, relevant auxiliary anti-counterfeiting certification information can be added in the anti-counterfeiting portion by the following means, for example printing ink doped with fine powder is adopted to print the code (4) and/or the image-text (5) on the printing material (2), or some randomly distributed fine powder is applied onto the printing material (2), wherein the fine powder has a width within the range of 0.01-0.05 mm and a length within the range of 0.2-0.6 mm; then, the random distribution characteristics information of the fine powder in the code (4) and/or the image-text (5) is further acquired and stored as secondary auxiliary anti-counterfeiting characteristics information in the database, a secondary auxiliary anti-counterfeiting characteristics information file and a file of association relationship between the secondary auxiliary anti-counterfeiting characteristics information file and the information of the code (4) are established and stored in the database. The fine powder is the fluff (for 1-3D static flocking) with a width better within the range of 0.01-0.05 mm and a length better within the range of 0.2-0.6 mm. In this way, during the anti-counterfeiting verification, in accordance with the information of the to-be-verified code (4) of the to-be-verified printing material (2), the secondary auxiliary anti-counterfeiting characteristics information file associated with the information of the to-be-verified code (4) is searched in the database, and anti-counterfeiting verification is carried out on the to-be-detected secondary auxiliary anti-counterfeiting characteristics information on the basis of the searched secondary auxiliary anti-counterfeiting characteristics information file.

Here, the anti-counterfeiting verification on the to-be-detected secondary auxiliary anti-counterfeiting characteristics information on the basis of the searched secondary auxiliary anti-counterfeiting characteristics information file specifically includes: searching the secondary auxiliary anti-counterfeiting characteristics information file which is associated with the information of the to-be-verified code (4) in the database according to the information of the to-be-verified code (4) of the to-be-verified printing material (2), and carrying out the anti-counterfeiting verification on the length-width ratio of the powder recorded in the to-be-detected secondary auxiliary anti-counterfeiting characteristics information on the basis of the length-width ratio of the powder recorded in the searched secondary auxiliary anti-counterfeiting characteristics information file.

In this embodiment of the invention, during acquisition of the saw tooth characteristics information of the anti-counterfeiting portion, the anti-counterfeiting portion on the printing material (2) can be further partially photographed by a magnifying power which is not smaller than a preset magnifying power to obtain a partial saw tooth characteristics picture (8), and the partial saw tooth characteristics picture (8) includes the saw tooth characteristics information of the anti-counterfeiting portion. In this way, in the subsequent anti-counterfeiting verification, the camera phone only requires partially photographing the anti-counterfeiting portion of the to-be-verified printing material (2) by a magnifying power to reduce the size of the picture and reduce the data traffic required to upload the picture to the Internet.

In this embodiment of the invention, preferably, the preset magnifying power is set (calculated) on the basis of the resolution of 125, 250, 500, 1,000, 2,500, 5,000, 10,000, 25,000, 50,000, or at most 150,000 pixels per square millimeter of the anti-counterfeiting portion. In other words, the anti-counterfeiting portion per square millimeter is recorded to have a resolution of 125, 250, 500, 1,000, 2,500, 5,000, 10,000, 25,000, 50,000, or at most 150,000 pixels, for example a specially photographed picture is used as a record. The resolution of the anti-counterfeiting portion is called the recording resolution (of the anti-counterfeiting portion) in the invention.

For example, if a certain picture called up from the database of the anti-counterfeiting network verification system has 12,500 pixels and the object recorded in the picture is a complete QR code with a size of 1 square centimeter, then the recording resolution of the QR code is 125 pixels per square millimeter, which means that the recording resolution of the QR code is 12,500 pixels per square centimeter, and that the recording resolution of the QR code is 80,654 pixels per square inch.

Reverse experiments show that, on a saw tooth characteristics picture (8) which is photographed by using a (low) resolution of smaller than 125 pixels per square millimeter of the anti-counterfeiting portion, it is very difficult to see tiny saw teeth with an actual height of close to 0.3 mm and an actual width of close to 0.3 mm with the naked eye.

Reverse experiments also show that, on a saw tooth characteristics picture (8) which is photographed by using a (low) resolution ratio of smaller than 1,000 pixels per square millimeter of the anti-counterfeiting portion, it is very difficult to see tiny saw teeth with an actual height of close to 0.3 mm and an actual width of close to 0.3 mm with the naked eye.

In contrast, for over a decade, pictures obtained according the "structural texture anti-counterfeiting method (patent No. CN1074563C)" have always been "low-resolution" texture images (namely pictures) with 40-80 pixels per square millimeter. Practice has proved that the low-resolution anti-counterfeiting pictures can completely meet the users' demands on identifying texture distribution, character inclination angle, random patterns and character colors with the naked eye, but cannot meet the demand on identifying tiny saw teeth of the invention.

Experiments also show that, even if the printing paper of the printing material (2) is photographed by a high resolution of 150,000 pixels per square millimeter of the anti-counterfeiting portion, the pulp fibers are still invisible on the picture.

Thus it can be seen that the preset magnifying power of the invention and the preset size ranges of the saw tooth must form a certain correspondence relationship.

As mentioned above, in this embodiment of the invention, the anti-counterfeiting verification can be carried out on the anti-counterfeiting database side, and then the verification conclusion is fed back to the user terminal. In this circumstances, the verification request that is sent from the camera phone of the user and carries the to-be-detected picture (18) of the to-be-verified printing material (2) and the information of the code (4) is received, wherein the to-be-detected picture (18) is obtained through photographing the anti-counterfeiting portion of the to-be-verified printing material (2) by using a lens with a lens resolution which is greater than a preset pixel threshold by adopting a magnifying power which is not smaller than a preset magnifying power at a distance which is smaller than a preset distance to a photographed object; the saw tooth characteristics picture (8) which is associated with the information of the code (4) of the to-be-verified printing material (2) is searched in the database, and the saw tooth edge (6) of the to-be-detected picture (18) is verified according to the saw tooth characteristics picture (8) to obtain a verification conclusion, and the verification conclusion is sent to the camera phone of the user. Here, when the quality of the photographed to-be-detected picture (18) meets preset requirements, the saw tooth characteristics picture (8) and the to-be-detected picture (18) are compared by using a preset alignment algorithm to obtain the verification conclusion; and, when the quality of the photographed to-be-detected picture (18) does not meet the preset requirements, the to-be-detected picture (18) and the saw tooth characteristics picture (8) are sent to an on-line human-aided verification address, and then the verification conclusion is fed back after the manual verification is received.

In this embodiment of the invention, the saw tooth characteristics picture (8) can also be fed back to the user terminal such that the anti-counterfeiting verification can be carried out at the user terminal side. In this circumstance, the verification request that is sent from the camera phone of the user and carries the information of the code (4) of the to-be-verified printing material (2) is received; the saw tooth characteristics picture (8) which is associated with the information of the code (4) of the to-be-verified printing material (2) is searched in the anti-counterfeiting database and the searched saw tooth characteristics picture (8) is sent to the camera phone of the user such that the saw tooth characteristics picture (8) and the to-be-detected picture (18) of the to-be-verified printing material (2) can be utilized to carry out the anti-counterfeiting verification on the side of the camera phone of the user, wherein the to-be-detected picture (18) is obtained through photographing the anti-counterfeiting portion of the to-be-verified printing material (2) by using a lens with a lens resolution ratio which is greater than a preset pixel threshold by a magnifying power which is not smaller than a preset magnifying power at a distance which is smaller than a preset distance to a photographed object.

For example, a camera phone with a lens resolution of ≥8 million pixels can be used to photograph (scan) the code (4) and/or the image-text (5) on the printing material (2) by a magnifying power at a micro-distance of smaller than 290 mm away from the code and/or image-text, and the photographed saw tooth characteristics picture (8) together with the information of the code (4) are uploaded to the ink edge anti-counterfeiting network verification system, and the ink edge anti-counterfeiting network verification system compares and verifies the photographed saw tooth characteristics picture (8) and the information of the code (4) with the anti-counterfeiting characteristics information which is stored in the anti-counterfeiting database, and feeds back the verification conclusion to the camera phone.

Or, the camera phone is used to scan the code (4) on the printing material (2), calls up a saw tooth characteristics picture (8) from the database of the ink edge anti-counterfeiting network verification system according to the information of the code (4), wherein the picture is a picture of a file; then, a camera phone (the same phone or another phone) with a lens resolution of ≥8 million pixels is selected as a magnifying lens, and the mobile phone lens is placed at a position at a distance of smaller than 290 mm away from the code (4) and/or the image-text (5) (or take a picture) to magnify (the picture) the individual saw tooth edge (6) on the printing material (2); if the magnified individual saw tooth edge (6) is identical with the individual saw tooth edge (6) on the picture of the file is observed with the naked eye, and then a true-or-false judgment is made.

Or, a camera phone with a lens resolution of ≥8 million pixels is used to scan the code (4) and/or the image-text (5) on the printing material (2) to acquire the information of the code (4) and to-be-detected picture (18) of the individual saw tooth edge (6), and then call up a saw tooth characteristics picture (8) from the database of the ink edge anti-counterfeiting network verification system according to the scanned information of the code (4), wherein the picture is a picture of a file; then, the to-be-detected picture (18) and the picture of the file are displayed on the screen of the mobile phone at the same time; next, if the individual saw tooth edge (6) on the to-be-detected picture (18) is identical with the individual saw tooth edge (6) on the picture of the file is observed with the naked eye, then a true-or-false judgment is made.

Or, a camera phone with a lens resolution of ≥8 million pixels is used to scan the code (4) and/or the image-text (5) on the printing material (2), upload the information of the code (4) to the ink edge anti-counterfeiting network verification system, call up the corresponding anti-counterfeiting characteristics information (picture of the file), compare and verify the to-be-detected picture (18) with the characteristics of the individual saw tooth edge (6) on the picture of the file through relevant application programs of the camera phone, and a verification conclusion is obtained.

Optionally, in this embodiment of the invention, the code (4) and/or the image-text (5) has an individual saw tooth edge (6) in a partial area, which means that the saw tooth edge (6) is formed in a partial area of the code (4) and/or the image-text (5); or, an individual saw tooth edge (6) in a partial area of the code (4) and/or the image-text (5) is photographed by a magnifying power, and the saw tooth characteristics picture (8) in this partial area is used as anti-counterfeiting characteristics information, meaning during acquisition of the saw tooth characteristics information of the anti-counterfeiting portion in this embodiment of the invention, the partial area of the code (4) and/or an image-text (5) is further photographed by a magnifying power which is not smaller than a preset magnifying power to obtain the partial saw tooth characteristics picture (8), wherein the partial saw tooth characteristics picture (8) includes the saw tooth characteristics information of the anti-counterfeiting portion. In other words, in order to reduce the storage pressure of the database, save data traffic and enhance search speed, photographing and saving the partial magnified picture of the individual saw tooth edge (6) is very beneficial.

In this embodiment of the invention, the preset magnifying power is set according to the standard that the shapes of the printing lattice points or single ink dots (21) in the code (4) and/or the image-text (5) in the photographed saw tooth characteristics picture (8) can be observed with the naked eye. This standard by can be set by statistically pre-gathering the conclusions of a plurality of users on the observation and identification of lattice points or a single ink dots which are photographed by different magnifying powers, and then according to the conclusions, setting the magnifying power which ensures that users in a preset ratio can observe the lattice points or single ink dots.

Through application research, the inventor found that the printing oil color of the printing ink individual saw tooth edge (6) which is formed by casting or diffusion and micro-deformation becomes shallow in a transitional way, resulting in an obscured profile of the individual saw tooth edge (6), and then further resulting in failure in identification, in particular failure in identification by an anti-counterfeiting inquiry APP. In order to solve the above problems and ensure that the profile of the individual saw tooth edge (6) is clear and easy to identify, in this embodiment of the invention, the printing method 5 includes the step of applying a cold wave membrane (10) onto the electronic printing ink (3) which forms the code (4) and/or the image-text (5) in the time period from the end of printing to the beginning of drying, and pressing the membrane with a compression roller (9), drying the code (4) and/or the image-text (5) by using a drying lamp (19) and tearing off the cold wave membrane (10) to transfer a part of a transfer layer (7) on the cold wave membrane (10) onto the code (4) and/or the image-text (5) such that the code (4) and/or the image-text (5) forms an individual saw tooth edge (6) with a clear profile. In this way, the fuzzy printing ink individual saw tooth edge (6) is converted into the individual saw tooth edge (6) with a clear and visible transfer layer (7). In other words, the transfer layer (7) corresponding to the code (4) and/or the image-text (5) is transferred to cover the code (4) and/or the image-text (5). Here, the electronic printing ink (3) plays the role of a cold wave glue. The inventor initially adopts this application, so the electronic printing ink can also be called electronic glue which is used to adhere the transfer layer (7) and transfer the transfer layer (7) onto the code (4) and/or the image-text (5).

Of course, a gold hot wave membrane (10) can be used to hot print an image-text (5) onto an uneven printing material (2) such that the image-text (5) has a golden individual saw tooth edge (6). This method is also feasible.

In order to enhance difficulties in counterfeiting, the individual characteristics of the transfer layer (7) on the code (4) and/or the image-text (5) can be improved, for example, the transfer layer (7) of the cold wave membrane (10) is molded and pressed with some laser patterns or strips, or the transfer layer (7) of the cold wave membrane (10) is pre-printed with some colored strips or patterns. In this way, the individual characteristics information, namely a section of randomly intercepted laser patterns or strips or colored strips or colored patterns, of the transfer layer (7) on the code (4) and/or the image-text (5) can also be photographed and stored as anti-counterfeiting characteristics information in the database of the ink edge anti-counterfeiting network verification system, and the anti-counterfeiting characteristics information, as another piece of individual auxiliary anti-counterfeiting characteristics information, can be further used by users for anti-counterfeiting verification.

In other words, a section of randomly intercepted laser patterns or strips or colored strips or colored patterns on the transfer layer (7) on the code (4) and/or the image-text (5) can be photographed and stored in the database of the ink edge anti-counterfeiting network verification system, and registered as another piece of individual auxiliary anti-counterfeiting characteristics information to be further used by users for anti-counterfeiting verification.

In conclusion, when adopting the printing method 5 to generate the individual saw teeth, the ink edge anti-counterfeiting method in this embodiment of the invention can handle the saw teeth by adopting at least one of the following methods (1)-(5), to add anti-counterfeiting characteristics information or make the anti-counterfeiting characteristics information more obvious.

(1) The transfer layer (7) is molded and pressed with some laser patterns or strips.

(2) The transfer layer (7) is printed with colored strips or patterns.

(3) The transfer layer (7) is doped with some fine powder, wherein the fine powder is transferred to the code (4) and/or the image-text (5) and the random distribution characteristics of the fine powder, as a piece of auxiliary anti-counterfeiting characteristics information, is acquired and registered in the database of the ink edge anti-counterfeiting network verification system.

(4) The transfer layer (7) on the code (4) and/or the image-text (5) is also covered with a transparent flattening protective layer; or the electronic printing ink (3) is doped with a flattening agent (for example 3%-5%). In this way, the defect that the electronic printing ink (3) reflects light and affects the quality of the photographed saw tooth characteristics picture (8) can be eliminated. For example, a white reflecting point looks like a gap. The gap generated by light reflection has two protruding edges, looking like a saw tooth. In other words, the light reflection must be eliminated to ensure the consistency between a real object and a picture thereof.

(5) A compression roller (9) with an uneven roller face is adopted for extrusion. In order to enhance difficulties in counterfeiting and facilitate identification, the individual characteristics of the individual saw tooth edge (6) of the transfer layer (7) can be increased, for example, making the roller face of the compression roller (9) of the cold wave membrane (10) uneven. In this way, the compression roller (9) with an uneven roller face can apply a non-uniform pressure to the undried electronic printing ink (3) below the transfer layer (7) such that the electronic printing ink (3) generates an obvious random micro-deformation, thus increasing the individual characteristics of the individual saw tooth edge (6) of the transfer layer (7).

In this embodiment of the invention, a section of randomly intercepted laser patterns or strips or colored strips or colored patterns on the transfer layer (7) on the code (4) and/or the image-text (5) can be photographed and stored in the database of the ink edge anti-counterfeiting network verification system, and registered as another piece of individual auxiliary anti-counterfeiting characteristics information to be further used by users for anti-counterfeiting verification.

In order to prevent the individual saw tooth edge (6) of the transfer layer (7) from being damaged by accident after photographing and thus causing inconsistency between the picture and the real object, resulting in mis-judgment, the transfer layer (7) on the code (4) and/or the image-text (5) can be covered with a transparent protective layer. In this way, the transparent protective layer can be applied first, and then the saw tooth characteristics picture (8) can be acquired, thus avoiding inconsistency between the picture and the real object.

Besides, in order to ensure the quality of the code (4), in this embodiment of the invention, a secondary jet printing method can be adopted to print a part of the anti-counterfeiting portion [namely the code (4) and/or the image-text (5)] first such that no saw tooth edge (6) is generated in the area of this part, and then print the other part of the code (4) such that an individual saw tooth edge (6) is generated in the area of the other part.

In other words, the individual saw tooth edge (6) exists in a partial area of the code (4) and/or the image-text (5). For example, the code (4) may have no individual saw tooth edge (6), while the corresponding image-text (5) has the individual saw tooth edge (6), to facilitate information of the code (4).

To solve the hidden quality problems (such as no saw tooth) of a few individual saw tooth edges (6) that appear in the production process, the following measure can be taken. Optionally, in this embodiment of the invention, the image-text (5) and/or the code (4) is printed by adopting the printing ink which is doped with fine powder; or the printing material (2) has some randomly distributed fine powder; the random distribution characteristics of the fine powder is also photographed by a magnifying powder, and the distribution characteristics information thereof is stored as another piece of auxiliary anti-counterfeiting characteristics information in the database of the ink edge anti-counterfeiting network verification system. Here, the fine powder has various shapes, for example, round, square, triangle, hexagon, long strip, short fiber in various colors, etc. In this way, when the characteristics of the individual saw tooth edge (6) are not obvious, the distribution characteristics of the fine powder can be verified to check if the verified product is real or not.

Optionally, when the printing method 5 is adopted, in this embodiment of the invention, the transfer layer (7) can be doped with some fine powder, wherein the fine powder is transferred to the code (4) and/or the image-text (5) and the random distribution characteristics of the fine powder, as a piece of auxiliary anti-counterfeiting characteristics information, is acquired and registered in the database of the ink edge anti-counterfeiting network verification system.

Here, the size of the fine powder is ≥0.01 mm. The shape of the powder is not specific, so the powder size here refers to the size of the maximum length value measured in any direction.

Through research, the inventor found that the codes (4) and/or image-texts (5) jet printed by using UV ink, water-based ink, oil solvent ink, etc. have the most obvious individual saw tooth edges (6), and those inks are particularly applicable to the invention, so those printing inks are preferably adopted in the embodiment of the invention. This is because the volume of ink currently jetted by an ink-jet printer is 3-30 picoliter, namely a single ink dot (21). Any one of the jet printed codes (4) and image-texts (5) is formed through the array and combination of single ink dots (21), and every single ink dot (21) rushes to the printing material (2) at a very high speed, so every one of the ink dots (21) splashes on the printing material (2), and then the individual saw tooth edges (6) in various shapes of single ink dots (21) are formed. In other words, the code (4) and/or the image-text (5) with the individual saw tooth edge (6) is preferably jet printed with an ink-jet printer (1). Research also shows that the individual saw tooth edges (6) of the codes (4) and/or image-texts (5) jet printed on paper and coatings that have high wettability are obvious. For example, when the codes (4) and/or image-texts (5) are jet printed on unsized paper and hydrophilic or lipophile coatings, the individual saw tooth edges (6) are obvious without adopting auxiliary treatment such as extrusion and air blowing. Therefore, in this embodiment, paper and coatings that have high wettability can be used as the printing materials (2).

Terminals (for example camera phones) of common users vary with brands, models, functions, photographing levels and achieve different photographing effects under different environmental light rays, so the to-be-detected pictures (18) of the individual saw tooth edges (6) that are photographed for verifying if products are real or not are also different in quality. It is possible that some to-be-detected pictures (18) do not meet the quality requirements and cannot be automatically identified by the ink edge anti-counterfeiting network verification system. In order to solve this problem, the embodiment of the invention designs the following technical solution.

After the ink edge anti-counterfeiting network verification system receives a to-be-detected picture (18) and a code (4) thereof from the a user terminal, if the system software fails to perform automatic identification and comparison, then a corresponding saw tooth characteristics picture (8) is called up from the database according to the code (4), wherein the saw tooth characteristics picture (8) is a picture of a file; the to-be-detected picture (18) and the picture of file together are displayed on the display screen of a working computer of an auxiliary verification person; then, the auxiliary verification person observes if the individual saw tooth edge (6) on the to-be-detected picture (18) is consistent with the individual saw tooth edge (6) on the picture of the file, and then manually draws a true-or-false conclusion, and feeds back the verification conclusion information to the user terminal through the ink edge anti-counterfeiting network verification system.

The code (4) in the invention is used to exclusively mark a printing material (2) where the code (4) is printed. The codes (4) specifically include one or more of the following codes, for example, sequence numbers, one-dimensional bar codes, QR codes, production date, product batch number, anti-counterfeiting code, anti-counterfeiting digital code, promotion credit code, award code, anti-cross-region-sales code, commodity retracing mode, etc.

The image-text (5) in the invention generally refers to various patterns, characters, punctuation marks, strokes, dots, lines, etc.

The printing materials (2) in the invention refer to all articles that can be printed with the code (4) and/or the image-text (5). The articles refer to various articles that can receive printing ink or adsorb pigments or can be etched with lasers, and can present the code (4) and/or the image-text (5), for example, all kinds of products, including various commodity packing materials, various tickets and invoices, various labels, various books, various parts and accessories, various components, various pipes, various plastic products, various metallic products, various wooden products, various glass products, various ceramic products, various leather products, various textiles, various fruits and various eggs, and surfaces thereof.

In accordance with the international conventions, the saw tooth size (namely saw tooth area) in the invention is expressed with the letter S, the saw tooth height is expressed with the letter H, and the saw tooth width is expressed with the letter W.

Figure 21:
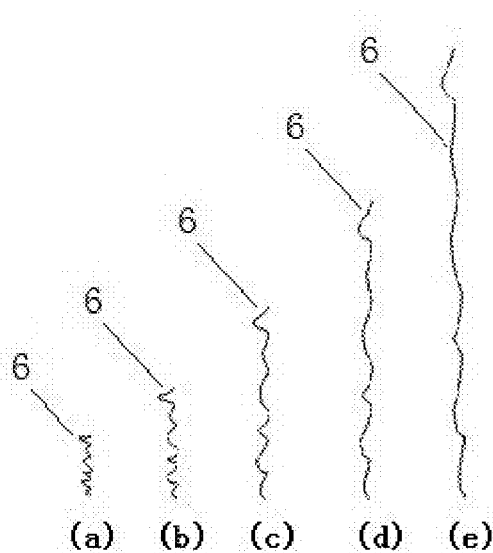
FIG. 21 shows various schematic views of the saw tooth edge in FIG. 9.
Figure 22:
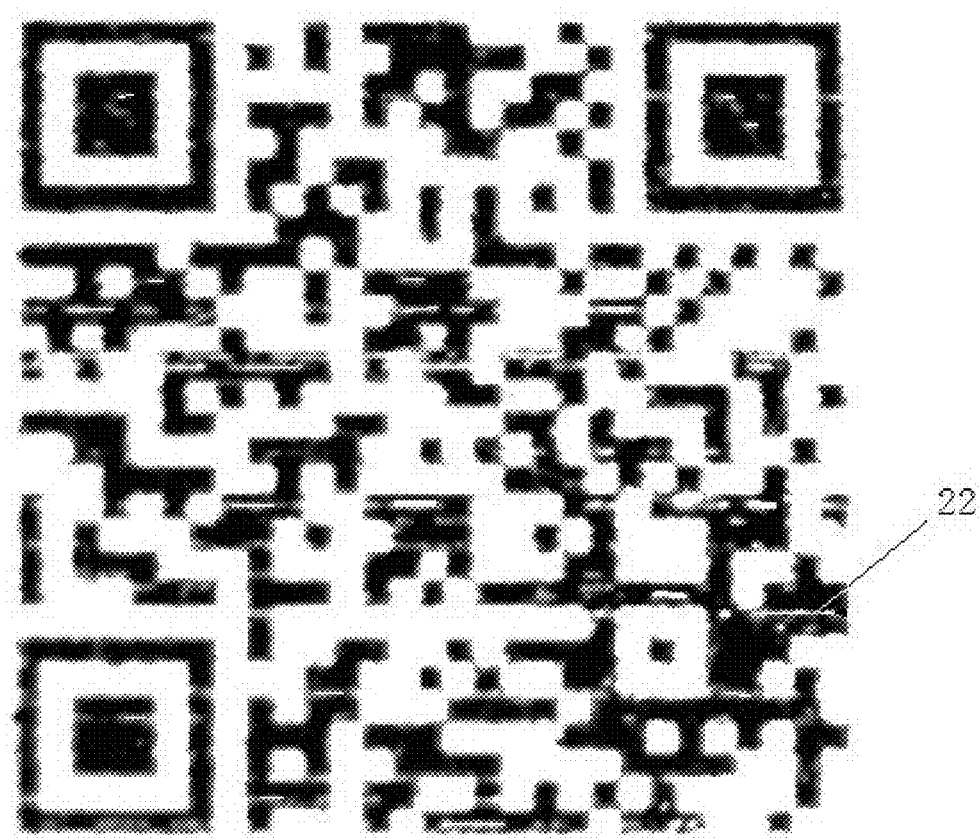
FIG. 22 is a schematic view of a QR code with quality defects such as marks in an embodiment of the invention.

The individual saw tooth edge (6) in the invention can be directly seen with the naked eye; the tiny saw teeth may be blurred or not clear, but when observed with a camera phone by a magnifying power (indirectly), the individual saw tooth edges (6) of the tiny saw teeth can be seen clearly. As shown in FIG. 21, when the saw tooth heights (H) of the single saw teeth on the saw tooth edge (6) are identical while the widths W thereof get bigger, the lines of the saw tooth edges (6) present curved lines, wherein (a), (b), (c), (d) and (e) are respectively lines of the five saw tooth edges (6) of which the saw tooth heights H are identical while the saw tooth widths W getter bigger. From the FIG. 21, it can also be seen that, when the saw tooth heights H are very small and the saw tooth widths W are very large, the lines of the saw tooth edges (6) look like curves that bend randomly. In other words, the ink edge of the code (4) and/or the image-text (5) is a random curve formed by random deformation, namely the saw tooth edge (6) in the invention.

The saw teeth in the invention include the protruding saw teeth on the ink edges of the codes (4) and/or image-texts (5), include recessed saw teeth (usually called gaps/cracks), and also include saw teeth of the laser die-cut edges and the saw teeth of the laser codes (characters/line edges).

The saw tooth characteristics information in the invention includes the saw tooth characteristics picture (8), and the simulating picture (15) of the anti-counterfeiting portion, includes various data, codes, gray values, colors, graphs, curves, vector diagrams, etc., that can reflect the characteristics of the individual saw tooth edge (6), and also includes the electronic file (13) of individual saw tooth edges (6) and/or marks. In order to save the storage space of the database and save data traffic, the anti-counterfeiting database preferably stores various data, codes, gray values, colors, graphs, curves, vector diagram, etc., that are extracted from the saw tooth characteristics picture (8) and can reflect the characteristics of the individual saw tooth edges (6), and the electronic files (13) of individual saw tooth edges (6) and/or marks that are generated before printing, instead of directly storing the saw tooth characteristics picture (8) which occupies a relatively large space.

The technical solution where the size of a single saw tooth that is greater than or equal to 0.03 mm (H) and smaller than or equal to 0.3 mm (H) is initially proposed and is achieved with huge efforts. Through research, the inventor found that the camera lenses of the most common and most popular camera phones used by users have a resolution of 5-13 million pixels; when those camera phones are adopted to photograph the code (4) and/or the image-text (5) printed on the printing material (2) and then the pictures are magnified and observed, users can clearly see the saw teeth printed on the codes (4) and/or the image-texts (5), wherein the minimum size of the single saw teeth on the printed code (4) and/or an image-text (5) is 0.03 mm(H)×0.03 mm(W), and the maximum size is 0.3 mm(H)×0.3 mm(W). In order to ensure that the individual saw tooth edge (6) in the invention can be photographed by a mobile phone and then identified by the user of the mobile phone, the second factor, namely easy identification, among the three factors of the anti-counterfeiting technologies, is required to be met. In this embodiment of the invention, the selected size parameter of a single saw tooth is ≥0.03 mm(H). Through the setting of this parameter, when the code (4) and/or the image-text (5) is normally observed with the naked eye, the ink edge is in order, does not affect the appearance and avoids quality complaints, and when the code (4) and/or the image-text (5) is photographed and observed by a magnifying power, the individual saw tooth edge (6) can be clearly seen, so that users can verify if a product is real or not. Of course, along with the scientific development, the resolution of the phone camera is also continuously enhanced. At that time, the size of a single saw tooth can be further reduced, and then the printing ink of the characters and link appear more in order and more beautiful with the naked eye. Therefore, the sizes of the saw teeth can be adjusted according to the identification capabilities of the current common user terminals.

The ink edge of the code (4) and/or the image-text (5) of the invention looks in order with the naked eye. These codes (4) and/or image-texts (5) generally refer to products that basically conform to the national standards, enterprise standards, user standards or user acceptable standards for printing quality when observed with the naked eye, for example, one-dimensional bar codes and QR codes meet the level-C printing standards. In other words, orderly ink edges generally refers to tiny saw teeth on the ink edges of the codes (4) and/or image-texts (5) that are directly seen with the naked eye with common vision, and on the invisible and fuzzy ink edges. In this way, the generated beneficial technical effect is that the code (4) and/image-text (5) can avoid deforming or turning, but only the ink edge such as the strokes of the code (4) and/image-text (5) generate invisible micro-deformations such as tiny saw teeth, so the existing design and print typesetting habits can be maintained, without affecting the quality and design appearance of the printed products.

The interfering strips (14) in the embodiment of the invention generally refer to various patterns, characters, symbols, lines, irregular dots, and foreground pictures and background pictures (for example, the background picture of the simulating printed face) formed by the same. The interfering strips (14) on each piece of simulating picture (15) are better different. In this way, the difficulties and cost in counterfeiting by reducing the simulating picture (15) into the original electronic file (13) and then carrying out secondary printing by using a digital printer (1) are increased for counterfeiters. In other words, after printing, the electronic file (13), (automatically generated) by software, of the code (4) and/or the image-text (5) with the individual saw tooth edge (6) is changed into the simulating picture (15) with the interfering strips (14); the simulating picture (15) with the additional interfering strips (14) cannot be directly printed and used, and the printing and counterfeiting can be carried out only after the interfering strips (14) are manually removed, greatly enhancing the counterfeiting cost, thus improving the counterfeiting threshold.

The diffusant coating in this embodiment of the invention is initially put forward by the inventor. The diffusant coating is formed by printing a printing coating which is added with a diffusant. By adding the existing commercially available chemical diffusant (required by product such electric iron) into coatings such as the printing ink, the required diffusant printing coating can be obtained. The diffusant coating can enable water drops or ink drops which fall on the coating to quickly diffuse or shrink along the surface of the coating.

In this embodiment of the invention, the printing materials (2) with uneven printed faces can be woven paper, embossed paper, woven fabric (plastic woven bag cloth), medicine aluminum-plastic panels with protrusions and recessions, wrinkled ink printed face, foamy ink printed face, cracking ink printed face, ice-flower ink printed face, multi-color coating spraying face, with rough printed faces.

Based on the above anti-counterfeiting method, this embodiment of the invention also provides an ink edge anti-counterfeiting network verification system. This system includes:

a database, wherein the database stores a saw tooth characteristics information file of a printing material (2) and a file of the association relationship between the saw tooth characteristics information file and the information of a code (4); the printing material (2) is printed with an anti-counterfeiting portion with a randomly generated saw tooth edge (6); the anti-counterfeiting portion includes a preset code (4) and/or an image-text (5); some single saw teeth on the saw tooth edge (6) are within preset size ranges [such that the ink edge of the saw tooth edge (6) looks in order (no tiny saw tooth is visible to the naked eyes) when observed with the naked eye] and after being photographed by a magnifying power which is not smaller than a preset magnifying power, are capable of being seen with the naked eye on the photographed pictures by the user; the saw tooth characteristics information file is obtained by photographing the anti-counterfeiting portion by a magnifying power which is not smaller than the preset magnifying power, wherein the single saw teeth are within the preset size ranges in which the maximum height is smaller than or equal to 0.3 mm and the minimum height is greater than or equal to 0.03 mm;

a communication unit for receiving the information of the to-be-verified code (4) of the to-be-verified printing material (2) and/or saw tooth characteristics information file that is sent from the camera phone of the user;

a verification processing unit for searching the saw tooth characteristics information file which is associated with the information of the to-be-verified code (4) in the database in accordance with the information of the to-be-verified code (4), and carrying out anti-counterfeiting verification on the anti-counterfeiting portion of the printing material (2) according to the searched saw tooth characteristics information file.

In order to acquire pictures and files and maintain the anti-counterfeiting database, the system also includes:

a printing processing unit for printing the anti-counterfeiting portion on the to-be-anti-counterfeited printing material (2);

and an acquisition and maintenance unit for acquiring the saw tooth characteristics information file of the anti-counterfeiting portion that is photographed by a magnifying power which is not smaller than the preset magnifying power, and the information of the code (4) for exclusively marking the printing material (2), and storing the acquired materials in the database.

Here, the printing processing unit can further adopt one or more of the following printing methods to print the anti-counterfeiting portion with the randomly generated saw tooth edge (6).

Printing method 1, including the steps of: printing a code (4) and/or an image-text (5) on a printing material (2) by jetting the printing ink, extruding or air blowing or scrapping the undried printing ink (3) which forms the code (4) and/or the image-text (5) within the time period from the end of printing to the beginning of drying, using an external force to drive the ink edge of the code (4) and/or the image-text (5) to generate random casting micro-deformation so as to form an individual saw tooth edge (6).

Printing method 2, including the steps of: enhancing the levelling property of the printing ink (3) and/or drying the undried printing ink (3) in a time-delayed way after ink-jet printing to increase the diffusion and deformation amplitude of the ink edge of a code (4) and/or an image-text (5) so as to form an individual saw tooth edge (6).

Printing method 3, including the steps of: pre-printing a diffusant coating at the position of a code (4) and/or an image-text (5) on a printing material (2), then printing the code (4) and/or the image-text (5) on the diffusant coating, driving the undried printing ink (3) to speed up diffusing to form a saw tooth edge (6).

Printing method 4, including the steps of: printing a code (4) and/or an image-text (5) on a printing material (2) with an uneven printed face, and driving the code (4) and/or the image-text (5) to generate random fragmentary micro-deformation in virtue of the characteristics of unevenness and no-uniform adhesion of the printing face to form an individual saw tooth edge (6).

Printing method 5, including the steps of: jet printing a code (4) and/or an image-text (5) on a printing material (2), applying a cold wave membrane (10) onto the electronic printing ink (3) (namely electronic glue) which forms the code (4) and/or the image-text (5) in the time period from the end of printing to the beginning of drying, and pressing the membrane with a compression roller (9); drying the code (4) and/or the image-text (5) and tearing off the cold wave membrane (10) to transfer a part of a transfer layer (7) on the cold wave membrane (10) onto the code (4) and/or the image-text (5) such that the code (4) and/or the image-text (5) forms an individual saw tooth edge (6) with a clear profile.

Printing method 6, including the steps of: hot printing a code (4) and/or an image-text (5) on a printing material (2) with an uneven printed face by using a hot wave membrane (10) such that the code (4) and/or the image-text (5) forms an individual saw tooth edge (6) with a clear profile.

Printing method 7, including the steps of: generating an electronic file (13) with an individual saw tooth edge (6)

and/or marks [of a code (4) and/or an image-text (5)], printing the electronic file (13) on a printing material (2), thus printing individual saw tooth edges (6) and/or marks; then, it is better to delete the electronic file (13) and saving no any original copy.

Printing method 8, including the steps of: when a printing material (2) is aluminum plastic blister packaging material, jet printing a code (4) onto the aluminum plastic blister packaging material, hot pressing and sealing the aluminum plastic blister packaging material such that an image-text (5) is randomly damaged to form an individual saw tooth edge (6).

Printing method 9, including the steps of: jetting one or more ink dots (21) onto a printing material (2) by using an ink-jet printer (1), wherein the ink dots (21) are arrayed to form a code (4), thus forming an individual saw tooth edge (6) after the ink dots dry.

Optionally, when the printing method 5 is adopted to print the anti-counterfeiting portion with the randomly generated saw tooth edge (6), the transfer layer (7) on the code (4) and/or the image-text (5) has random distribution characteristics information; the random distribution characteristics information includes at least one of the following characteristics information: the transfer layer (7) is pre-molded with a laser image-text; the transfer layer (7) is pre-printed with a colorful image-text; and, the transfer layer (7) is pre-mixed with fine powder randomly;

the acquisition and maintenance unit further acquires the random distribution characteristics information on the transfer layer (7) on the code (4) and/or the image text (5), stores the acquired information as primary auxiliary anti-counterfeiting characteristics information in the database, establishes a file of association relationship between the primary auxiliary anti-counterfeiting characteristics information and the information of the code (4), and stores the file in the database;

in accordance with the information of the to-be-verified code (4) of the to-be-verified printing material (2), the verification processing unit further searches the saw tooth characteristics information and the primary auxiliary anti-counterfeiting characteristics information that are associated with the information of the to-be-verified code (4) in the database, and carries out the anti-counterfeiting verification on the basis of the searched saw tooth characteristics information and the primary auxiliary anti-counterfeiting characteristics information.

Optionally, when the printing method 5 is adopted to print the anti-counterfeiting portion with the randomly generated saw tooth edges (6), the printing process unit further adopts the electronic printing ink (3) which is added with a flattening agent to jet print the code (4) and/or the image-text (5) on the printing material (2), or further applies a transparent flattening protective layer onto the transfer layer (7) of the code (4) and/or the image-text (5).

Optionally, the printing processing unit further adopts the printing ink doped with powder to print the code (4) and/or the image-text (5) on the printing material (2), or applies some randomly distributed fine powder onto the printing material (2), wherein the fine powder has a size within the range of: $0.05\ mm \geq W \geq 0.01\ mm$;

The acquisition and maintenance unit further acquires the random distribution characteristics information of the fine powder in the code (4) and/or the image-text (5), stores the acquired information as secondary auxiliary anti-counterfeiting characteristics information in the database, establishes a file of association relationship between the secondary auxiliary anti-counterfeiting characteristics information and the information of the code (4), and stores the file in the database.

In accordance with the information of the to-be-verified code (4) of the to-be verified printing material (2), the verification processing unit further searches the saw tooth characteristics information file and the secondary auxiliary anti-counterfeiting characteristics information that are associated with the information of the to-be-verified code (4) in the database, and carries out the anti-counterfeiting verification on the basis of the searched saw tooth characteristics information and the secondary auxiliary anti-counterfeiting characteristics information.

Optionally, the verification processing unit specifically receives the verification request that is sent from the camera phone of the user and carries the to-be-detected picture (18) of the to-be-verified printing material (2) and the information of the code (4), wherein the to-be-detected picture (18) is obtained through photographing the anti-counterfeiting portion of the to-be-verified printing material (2) by using a lens with a lens resolution which is greater than a preset pixel threshold by a magnifying power which is not smaller than a preset magnifying power at a distance which is smaller than a preset distance to a photographed object.

The verification processing unit specifically searches the saw tooth characteristics picture (8) which is associated with the information of the code (4) of the to-be-verified printing material (2) in the database, compares the saw tooth edges (6) in the saw tooth characteristics picture (8) and the to-be-detected picture (18), verifies the to-be-detected picture (18), obtains a verification conclusion, and sends the verification conclusion to the camera phone of the user.

Optionally, when the quality of the photographed to-be-detected picture (18) meets the preset requirements, the verifying processing unit further compares the saw tooth characteristics picture (8) and the to-be-detected picture (18) by using a preset alignment algorithm to obtain the verification conclusion; and, when the quality of the photographed to-be-detected picture (18) does not meet the preset requirements, the verifying processing unit sends the to-be-detected picture (18) and the saw tooth characteristics picture (8) to an on-line human-aided verification address, and receives the verification conclusion fed back after the manual verification.

Optionally, the verification processing unit further receives the verification request that is sent from the camera phone of the user and carries the information of the code (4) of the to-be-verified printing material (2); the verification processing unit searches the saw tooth characteristics picture (8) which is associated with the information of the code (4) of the to-be-verified printing material (2) in the database and sends the searched saw tooth characteristics picture (8) to the camera phone of the user to utilize the saw tooth characteristics picture (8) and the to-be-detected picture (18) of the to-be-verified printing material (2) to carry out the anti-counterfeiting verification on the side of the camera phone of the user, wherein the to-be-detected picture (18) is obtained through photographing the anti-counterfeiting portion of the to-be-verified printing material (2) by using a lens with a lens resolution which is greater than a preset pixel threshold by a magnifying power which is not smaller than a preset magnifying power at a distance which is smaller than a preset distance to a photographed object.

Next, the specific implementation of the invention is further described through a plurality of specific embodiments.

Embodiment 1

In this embodiment, the ink edge anti-counterfeiting method of the invention is adopted to manufacture an electronic medicine monitoring code-code (4).

Figure 5:
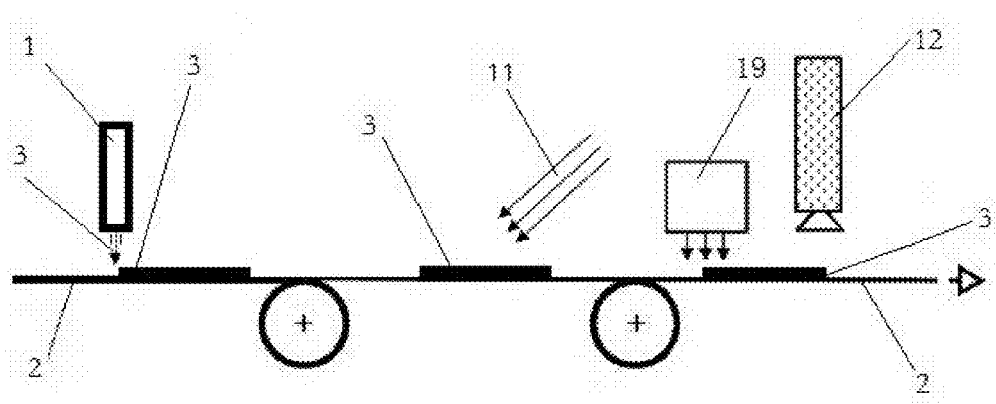
FIG. 5 is a schematic view of a process flow of a code or image-text (with a saw tooth edge) in an embodiment of the invention.
Figure 9:
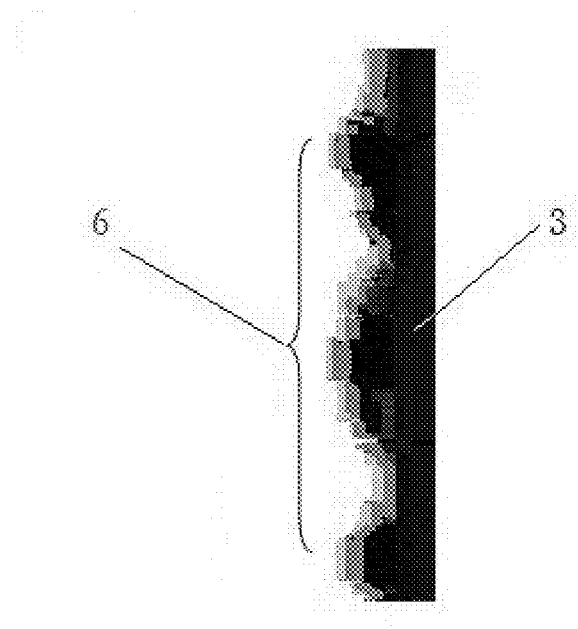
FIG. 9 is an enlarged schematic view of a saw tooth edge with gradient color and with an obscured profile in an embodiment of the invention.
Figure 10:
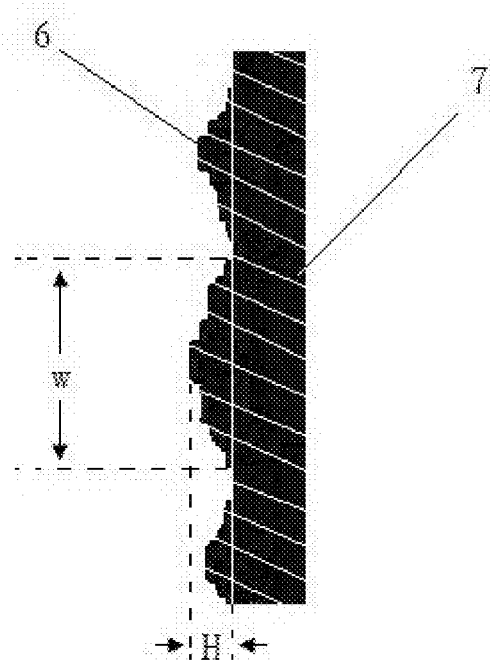
FIG. 10 is an enlarged schematic view of a saw tooth edge with a transfer layer and with an clear profile in an embodiment of the invention.

As shown in FIG. 1, FIG. 5 and FIG. 9, on a production line, a printer (1), for example, a UV ink-jet printer is adopted to jet codes on incoming printing materials (2), for example medicine boxes, to generate electronic medicine monitoring codes (4) with individual saw tooth edges (6), wherein it looks like that the codes (4) have orderly ink edges and reach the level-C printing standard.

In order to drive the bar codes and characters of the electronic medicine monitoring codes to generate microdeformation to generate more obvious individual saw tooth edges (6) with a single saw tooth size S of $\geq 0.03$ mm(H)× 0.03 mm(W), the following measure can be taken. An air gun can be erected between the ink-jet printer (1) and a UV drying lamp (19), and a high-pressure airflow, for example a strong wind (11), is blown to the printed undried electronic printing ink (3), such that the wind pressure urges the bar codes and characters of the electronic medicine monitoring codes to diffuse and deform. Of course, during the specific implementation process, an anti-viscose compression roller (9) can be adopted to roll the undried electronic printing ink (3) (printed by various printing processes) to force the printed lattice points, ink dots and character edges to generate micro-deformation, thus generating saw teeth with a size of 0.3 mm(H)$\geq$S$\geq$0.03 mm(H) that meets the design requirements. The individual saw tooth edges (6) of the electronic medicine monitoring codes manufactured in this way may have the following defects: gradient ramp and unclear profile. Refer to FIG. 9.

An industrial-level micro-lens digital camera (12) is needed to photograph the electronic medicine monitoring codes, which generate the individual saw tooth edges (6) after drying, by a magnifying power, wherein the magnifying power n is set according to the standard that the individual saw tooth edges (6) on the photographed saw tooth characteristics picture (8) can be clearly seen with the naked eye, wherein n$\geq$1 or 2 or 4 or 8 or 16 or 32 or 48; the characteristics information of the individual saw tooth edges (6) together with the information of the codes (4) is stored as anti-counterfeiting characteristics information (namely the basis for anti-counterfeiting verification) in the database of an ink edge anti-counterfeiting network verification system such that users can make true-or-false verification. Specifically, the following are anti-counterfeiting verification methods.

A user uses a smart camera phone with a screen size of $\geq 4$ inches and a lens resolution of $\geq 8$ million pixels to follow an anti-counterfeiting public account in WeChat or download a specially developed anti-counterfeiting inquiry APP, and then uses the smart camera phone (as a magnifying camera) to photograph a picture—saw tooth characteristics picture (8) of a code (4) and/or an image-text (5) on a piece of printing material (2) at a short distance (for example smaller than 65 mm) by a magnifying power, and uploads the anti-counterfeiting characteristics information such as the saw tooth characteristics picture (8) and the information of the code (4) to the ink edge anti-counterfeiting network verification system (by means including text messing or multi-media messaging), and then the ink edge anti-counterfeiting network verification system compares the characteristics of the to-be-detected saw tooth edge (6) with corresponding anti-counterfeiting characteristics information (a characteristics file of the saw tooth edge (6), and feeds back the information that the conclusion is true to the camera phone if the characteristics are matched, or feeds back the information that the conclusion is false to the camera phone if the characteristics are not matched.

For electronic medicine monitoring codes or QR codes that are formed by the above mentioned method through a series of links including printing, deforming, photographing and registering, a customer who has a camera phone with WeChat, Baidu, Taobao, and/or Wochacha software can log in to the ink edge anti-counterfeiting network verification system and call up the saw tooth characteristics picture (8) from the database (or through a PC), and then use another (or the same) smart camera phone (as a magnifying camera) with a screen size of $\geq 4$ inches and a lens resolution of $\geq 8$ million pixels to photograph a piece of picture—to-be-detected picture (18) of the characteristics the individual saw tooth (edge) of an electronic medicine monitoring code at a short distance (for example a distance of smaller than 65 mm), magnify the to-be-detected picture (18) on the screen of the phone, carefully observe if the characteristics of the individual saw tooth edges (6) on the two pictures are identical, and then make a true-or-false judgment by oneself. In order to facilitate the anti-counterfeiting verification, customers can download the anti-counterfeiting inquiry APP to make true-or-false judgments by oneself.

A user can also use a camera phone with a lens resolution of $\geq 8$ million pixels to scan the code (4) and/or the image-text (5) such as the QR code on the printing material (2) to acquire the information of the code (4) and to-be-detected picture (18) of the individual saw tooth edge (6), then call up a saw tooth characteristics picture (8) of the individual saw tooth edge (6) from the database of the ink edge anti-counterfeiting network verification system according to the scanned information of the code (4), wherein the picture is a picture of a file, then use a camera phone (as a magnifying camera) with a lens resolution of $\geq 8$ million pixels to photograph a to-be-detected picture (18) of the individual saw tooth edge (6) by a magnifying power at a short distance (for example, a distance of smaller than 65 mm), display the to-be-detected picture (18) and the picture of the file on the screen of the mobile phone at the same time, next observe if the individual saw tooth edge (6) on the to-be-detected picture (18) is identical with the individual saw tooth edge (6) on the picture of the file with the naked eye, and finally make a true-or-false judgment.

After downloading a specially developed anti-counterfeiting inquiry APP on a camera phone with a screen size of $\geq 4$ inches and a lens resolution of $\geq 8$ million pixels, a user can also use a camera to scan a code (4) and/or an image-text (5) on a piece of printing material (2), upload the information of the code (4) to the database of the ink edge anti-counterfeiting network verification system and call up a corresponding anti-counterfeiting characteristics information file; then, the camera phone compares the anti-counterfeiting characteristics information file with the characteristics information of the to-be-detected individual saw tooth edge (6), and displays the information that the conclusion is true on the screen if the detected characteristics information is matched, or displays the information that the conclusion is false if the detected characteristics information is not matched.

A user can also use a camera phone with a screen size of $\geq 4$ inches and a lens resolution of $\geq 8$ million pixels to take a picture of a code (4) and/or an image-text (5) on a piece of printing material (2) at a short distance (for example 55 mm) by a magnifying power, send the picture to the database of the ink edge anti-counterfeiting network verification system in a form of text message, multi-media message or a WeChat message of a WeChat official account, and wait for the ink edge anti-counterfeiting network verification system to verify the saw tooth characteristics and make a true-or-false conclusion.

Camera phones of common users vary in various aspects including photographing levels and achieve different photographing effects under different environmental light rays, so the to-be-detected pictures (18) of an individual saw tooth edges (6) that are photographed for verifying if a product is real or not are also different in quality. Some to-be-detected pictures (18) do not meet the quality requirements and cannot be automatically identified by the ink edge anti-counterfeiting network verification system. In order to solve this problem, the embodiment of the invention designs the following technical solution: after the ink edge anti-counterfeiting network verification system receives the to-be-detected picture (18) and the code (4) thereof that are sent from a camera phone (from a user) (if the system software fails to perform automatic identification), a saw tooth characteristics picture (8) (stored) in the database can be called up according to the code (4), wherein the picture is a picture of a file; then, the to-be-detected picture (18) and the picture of the file together are displayed on the screen of a working computer of an auxiliary verifier; then, the auxiliary verification person observes if the individual saw tooth edge (6) on the to-be-detected picture (18) is consistent with the individual saw tooth edge (6) on the picture of the file, then manually draws a true-or-false conclusion, and feeds back the verification conclusion information to the camera phone (of the user) through the ink edge anti-counterfeiting network verification system.

In order to increase difficulties in duplication and counterfeiting and prevent domestic thieves from copying the anti-counterfeiting characteristics information and then making counterfeit products, in this embodiment of the invention, a mesh can be added in front of the camera phone to form an interfering strip (14) on the picture. In this way, even if internal workers copy and steal the picture, a mesh pattern shows on a counterfeit code (4) which is printed according to the picture, so the counterfeit products show an inconsistency with the true products. Of course, an interfering strip (14) similar to the mesh can be added to a picture through simulation by software when a picture is generated instead of adding the mesh in front of the camera.

Embodiment 2

In this embodiment, an electronic medicine monitoring code—code (4) is manufactured.

As shown in FIG. 1, FIG. 2, FIG. 4 and FIG. 10, on a printing production line, an ink-jet printer (1), for example a UV ink-jet printer, is adopted to jet ink and print codes on certain incoming printing materials (2). The printed electronic printing ink (3) serves as cold wave glue. A silver laser cold wave membrane (10) is applied onto the printing material (2), rolled by a compression roller (9) and then torn off such that a silver transfer layer (7) is transferred to the electronic printing ink (3), thus generating an electronic medicine monitoring code with an individual saw tooth edge (6) which has a clear profile (no gradient ramp) and has a single saw tooth size S of ≥0.03 mm(H). The electronic medicine monitoring code manufactured in this way has the advantage that the individual saw tooth edge (6) has a clear profile and no gradient ramp, is easily and automatically identified by the anti-counterfeiting inquiry APP, and the advantage that the code (4) has a metallic luster and even individual laser patterns on the surface. The individual laser patterns are intercepted from the cold wave membrane (10) randomly, so it is very difficult to (intercept) register, duplicate and counterfeit the patterns for the second time.

Besides, the individual laser patterns are photographed and stored into the database of the ink edge anti-fake network verification system along with the individual saw tooth edge (6) for use by users to search, check and make a true-or-false judgment.

To perform better anti-counterfeiting, a section of randomly intercepted laser patterns or strips or colored strips or colored patterns on the transfer layer (7) on the code (4) and/or the image-text (5) can be photographed together and stored in the database of the ink edge anti-counterfeiting network verification system, and registered as another piece of auxiliary anti-counterfeiting characteristics information to be further used by users for anti-counterfeiting verification.

The transfer layer (7) is also doped with some randomly distributed fine powder, wherein the fine powder is transferred to the code (4) and/or the image-text (5) and the random distribution characteristics of the randomly distributed fine powder, as another kind of auxiliary anti-counterfeiting characteristics information, is acquired and registered in the database of the ink edge anti-counterfeiting network verification system.

In order to drive the bar code and characters of an electronic medicine monitoring code to generate diffusion and micro-deformation so as to generate a random individual saw tooth edge (6), the following measure can be taken. A compression roller (9) can be disposed between the ink-jet printer (1) and a UV drying lamp (19). The roller face is better designed to be an uneven roller face to roll the bar code and characters of the electronic medicine monitoring code such that the bar code and characters generate diffusion and micro-deformation.

Another digital camera (12) is needed to photograph the electronic medicine monitoring code which generates an individual saw tooth edge (6) after being dried and cured, stores and registers the picture in the database of the ink edge anti-counterfeiting network verification system.

Embodiment 3

Figure 6:
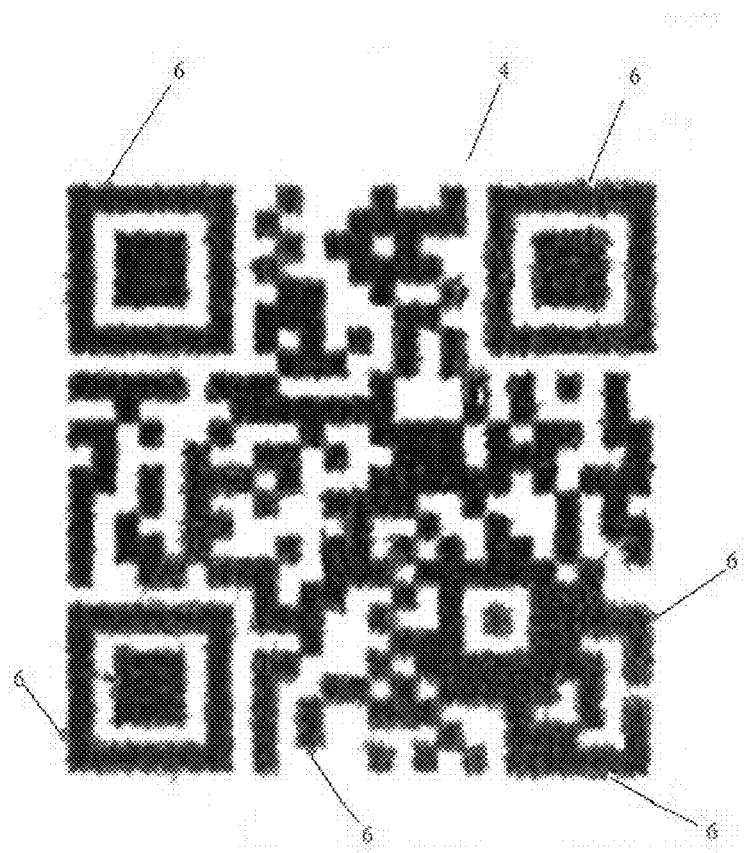
FIG. 6 is a schematic view of a QR code (with a saw tooth edge) in an embodiment of the invention.

In this embodiment, QR codes of the website and sequence number of the database of the ink edge anti-counterfeiting network verification system are manufactured, for example, a QR code with the content of http://t.ppk365.com/y3655j77BB56 (as shown in FIG. 6).

As shown in FIG. 5, FIG. 6 and FIG. 9, on a printing production line, an ink-jet printer (1), for example a UV ink-jet printer, is adopted to print codes on incoming printing materials (2), for example medicine boxes, to generate QR codes-codes (4) with individual saw tooth edges (6).

In order to drive the QR codes to generate diffusion and micro-deformation so as to generate individual saw tooth edges (6), the following measure can be taken. An air gun can be erected between the ink-jet printer (1) and the UV drying lamp (19), and a strong wind (11) is blown onto the printed undried electronic printing ink (3), such that the wind pressure urges the QR codes to generate micro-deformation by the effect of an external force, thus generating more obvious individual saw tooth edges (6) with a single saw tooth size S of ≥0.03 mm(H)×0.03 mm(W).

In order to urge the QR codes to generate a large diffusion and micro-deformation amplitude, the drying lamp (19) can be disposed at a position away from the jet nozzle to delay drying as long as possible such that the printing ink (3) has enough time to diffuse or shrink. According to a standard installation distance, the drying lamp (19) is smaller than or equal to 80 mm away from the jet nozzle. In order to delay drying, in this embodiment of the invention, the drying lamp

(19) can be installed at a position which is greater than 160 mm or 2,000 mm away from the jet nozzle.

In order to urge the QR codes to generate a large diffusion and micro-deformation amplitude, a diffusant coating, namely a printing coating added with a diffusant, can be pre-printed at the position of the code (4) and/or the image-text (5) on the printing material (2), then the code (4) and/or the image-text (5) is printed on the diffusant coating; next, the undried printing ink (3) is driven to speed up diffusing or shrinking to form the individual saw tooth edge (6). The diffusant is a commercially available chemical diffusant (required by products such electric irons), and when the diffusant is applied onto coatings such as printing ink, the required diffusant printing coating can be obtained.

In order to urge the QR codes to generate a large diffusion and micro-deformation amplitude, the leveling property (mobility) of the printing ink (3) can be enhanced to speed up the diffusion (flow) deformation of the printing ink (3).

Another digital camera (12) is needed to photograph the QR code which generates an individual saw tooth edge (6) after being dried, stores and registers the picture in the database of the ink edge anti-counterfeiting network verification system.

For QR codes that are formed by the above mentioned method through a series of links including printing, deforming, photographing and registering, a customer who has a camera phone with WeChat, Baidu, Taobao, and/or Wochacha software can scan the QR codes; then the phone can automatically log in to the ink edge anti-counterfeiting network verification system through a software program and call up the saw tooth characteristics picture (8) from the database; next, the user can use another (or the same) camera phone (as a magnifying camera) with a screen size of ≥4 inches and a lens resolution of ≥8 million pixels to photograph a piece of picture—to-be-detected picture (18) of the characteristics the individual saw tooth (edge) of a QR code at a short distance (for example a distance of smaller than 65 mm), magnify the to-be-detected picture (18) on the screen of the phone, carefully observe if the characteristics of the individual saw tooth edges (6) on the two pictures are identical, and then can make a true-or-false judgment by oneself.

Of course, a user can use a camera phone with a lens resolution of ≥8 million pixels as a magnifying lens, place the camera phone at a position at a distance of smaller than 65 mm away from the code (4) and/or the image-text (5), turn on the camera software or turn on the magnifying lens software, magnify the individual saw tooth edge (6) on the printing material (2), observe if the individual saw tooth edge (6) is identical with the individual saw tooth edge (6) on a picture of a file, and then make a true-or-false judgment.

Embodiment 4

An electronic medicine monitoring code or QR code with an individual saw tooth edge (6) in a partial area is manufactured by using the invention.

Figure 7:
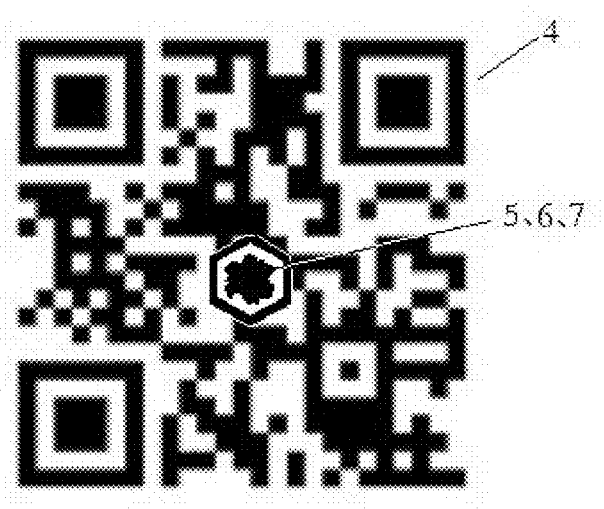
FIG. 7 is a schematic view of another QR code (partially with a saw tooth edge) in an embodiment of the invention.
Figure 8:
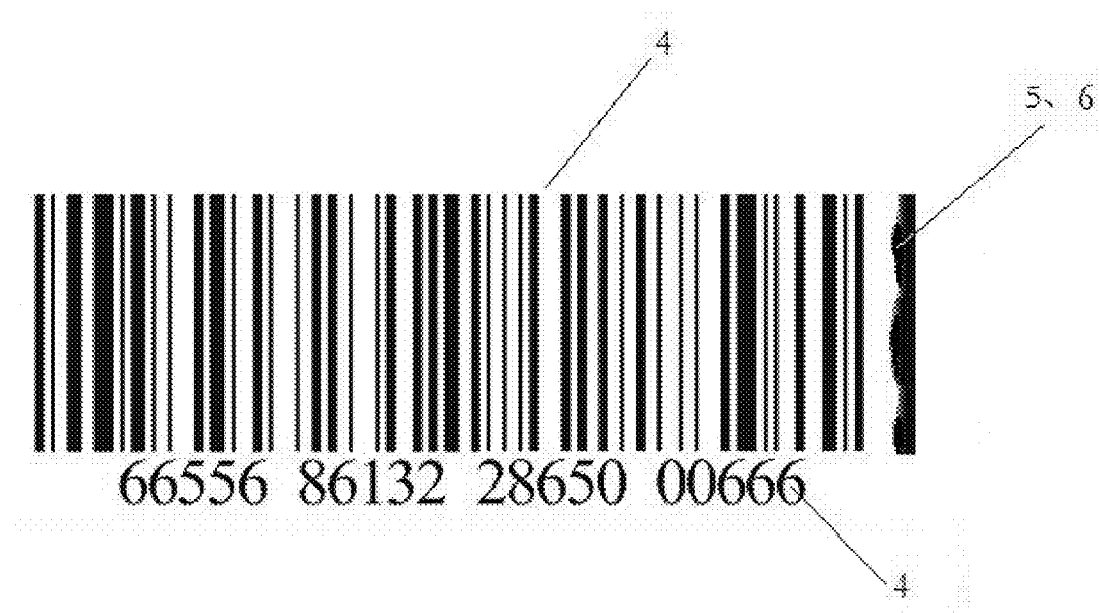
FIG. 8 is a schematic view of another electronic monitoring code (partially with a saw tooth edge) in an embodiment of the invention.

As shown in FIG. 7, FIG. 8 and FIG. 9, on a printing production line, an ink-jet printer (1), for example a UV ink-jet printer, is adopted to jet ink and print codes on printing materials (2), to generate electronic medicine monitoring codes or QR codes, namely codes (4), with individual saw tooth edges (6).

In order to urge a code (4) to generate micro-deformation in a partial area so as to generate a random individual saw tooth edge (6) in a partial area, the following measure can be taken. A secondary jet printing method can be adopted to jet print a part of the code (4) first without extrusion and air blowing such that no saw tooth edge (6) appears in the area of this part, and then the other part of the code (4) is jet printed such that an individual saw tooth edge (6) is generated in the area of the other part. Optionally, an air gun can be erected between the ink-jet printer (1) and the UV drying lamp (19), and compressed air, for example a strong wind (11), is blown onto a partial area of undried secondarily printed printing ink (for example, a glue dispenser is used to dispense a drop of red UV glue in the center area of the QR code), and then the wind pressure urges the partial area to generate micro-deformation by the effect of an external force, thus generating a more obvious individual saw tooth edge (6) with a single saw tooth size S of ≥0.03 mm(H)×0.03 mm(W).

Figure 11:
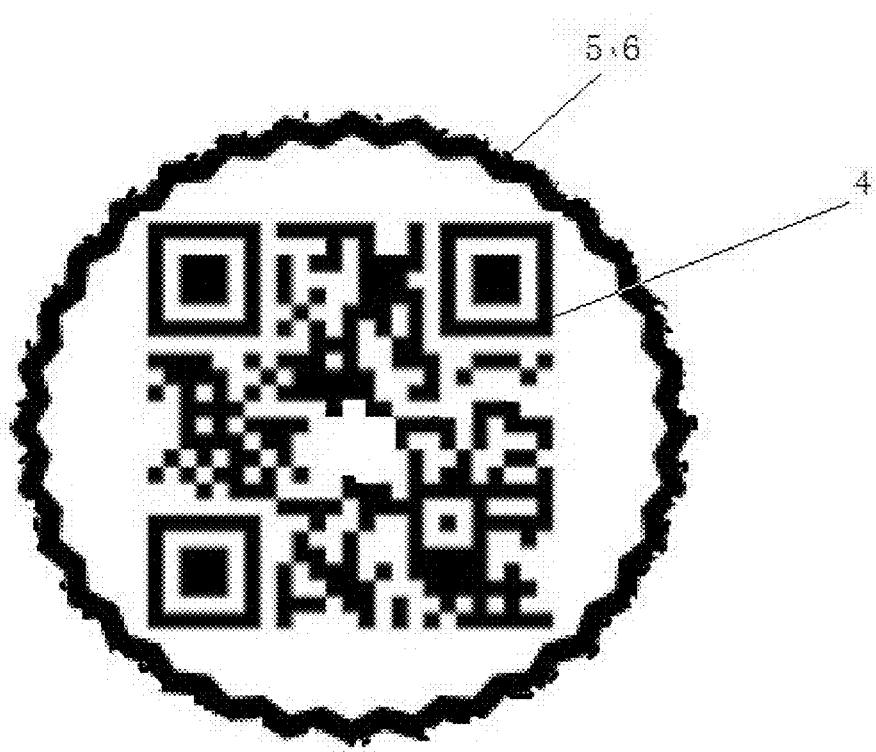
FIG. 11 is a schematic view of a QR code and its trim in an embodiment of the invention.
Figure 12:
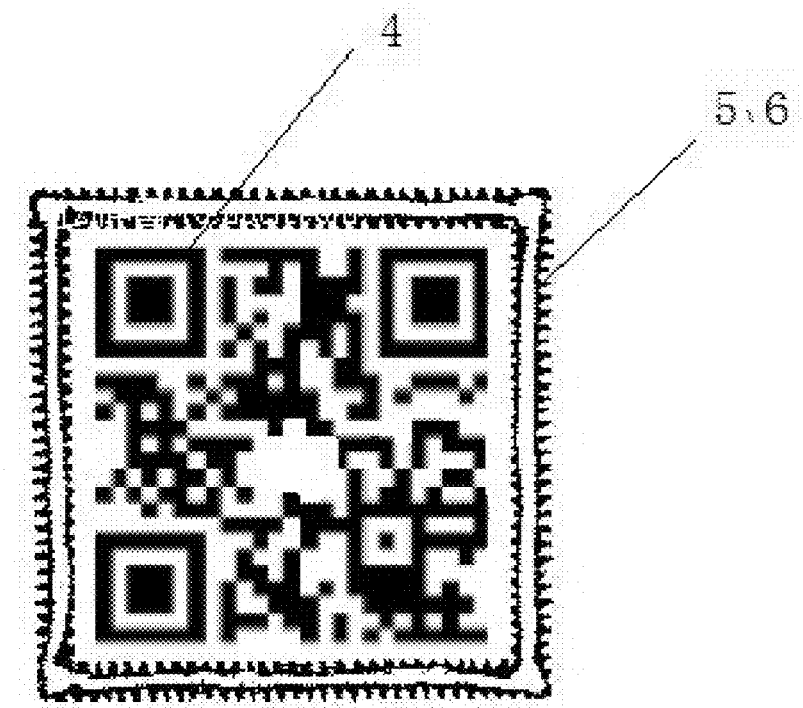
FIG. 12 is a schematic view of another QR code and its trim in an embodiment of the invention.
Figure 13:
FIG. 13 is a schematic view of a QR code and its characters in an embodiment of the invention.

Also as shown in FIG. 7, a vertical bar code-image text (5) can be printed next to an electronic medicine monitoring code, and the bar code is merely driven to generate an individual saw tooth edge (6). Also as shown in FIG. 11 and FIG. 12, a lace-image text (5) can be printed on four sides of the QR code, and the lace is merely driven to generate an individual saw tooth edge (6). Also as shown in FIG. 13, an illustrative image-text (5) "scan to check the truth" is printed next to the QR code, and the image-text is merely driven to generate an individual saw tooth edge (6).

Another digital camera (12) is needed to photograph the dried code (4) which generates a partial individual saw tooth edge (6), stores and registers the picture in the database of the ink edge anti-counterfeiting network verification system.

In this way, a user can use a camera of the camera phone to scan the code (4) and/or the image-text (5) on the printing material (2), upload the characteristics information of the saw tooth edge (6), in some partial areas, of the code (4) or an image-text (5) and the information of the code (4) to the database of the ink edge anti-counterfeiting network verification system; then, a computer anti-counterfeiting search system compares the uploaded information with a corresponding anti-counterfeiting characteristics information file, and feeds back the information that the conclusion is true to the camera phone if the characteristics information is matched, or feeds back the information that the conclusion is false if the characteristics information is not matched.

Embodiment 5

A QR code—code (4) with an individual saw tooth edge (6) is manufactured by adopting the invention.

Figure 14:
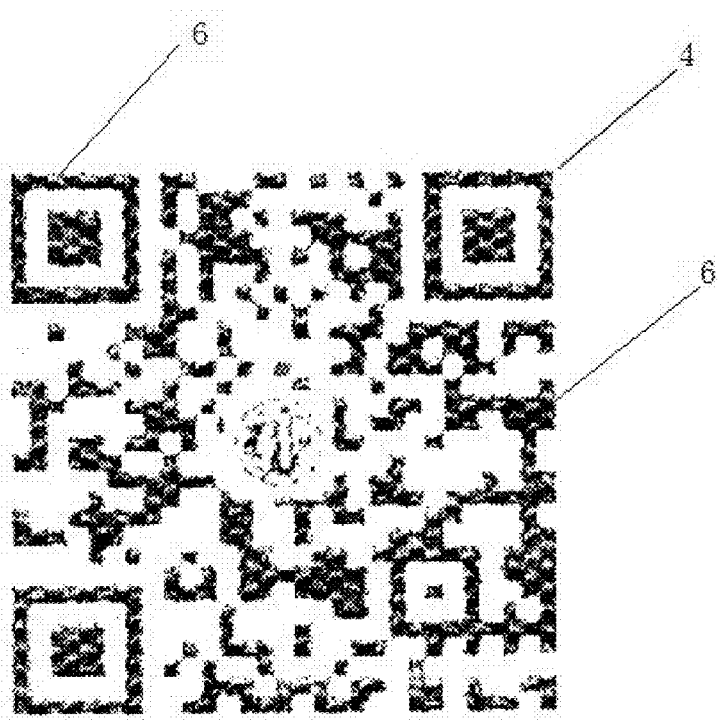
FIG. 14 is a schematic view of a QR code printed on an uneven printed face in an embodiment of the invention.

As shown in FIG. 14, an HP Indigo digital printer (1) can be adopted to print incoming printing materials (2) such as woven paper or embossed paper, and codes (4) and/or image-texts (5) are driven to generate random fragmentary micro-deformation by virtue of a characteristic where recessions fail to touch the printing plate and therefore have no printing ink (3) adhered to them, thus generating a QR code of a more obvious individual saw tooth edge (6) with a single saw tooth size S of ≥0.03 mm(H)×0.03 mm(W).

Another digital camera (12) is needed to photograph the dried code (4) which generates a partial individual saw tooth edge (6), stores and registers the picture in the database of the ink edge anti-counterfeiting network verification system.

For codes (4) that are formed by the above mentioned method through a series of links including printing, photographing and registering, a customer who has a camera phone with WeChat, Baidu, Taobao, and/or Wochacha software can scan the codes, and then the phone can quickly log in to the database of the ink edge anti-counterfeiting network verification system and call up a corresponding picture. Then, the customer can use the camera phone as a magnifying lens to carefully observe if the characteristics of the partial individual saw tooth edges (6) are consistent with the characteristics on the called picture, and then can make a true-or-false judgment by oneself. To facilitate the true-or-false verification, users can download a specially developed anti-counterfeiting inquiry APP to realize automatic comparison and true-or-false verification.

Embodiment 6

A QR code, namely code (4), with an individual saw tooth edge (6) is manufactured by adopting the invention.

Figure 15:
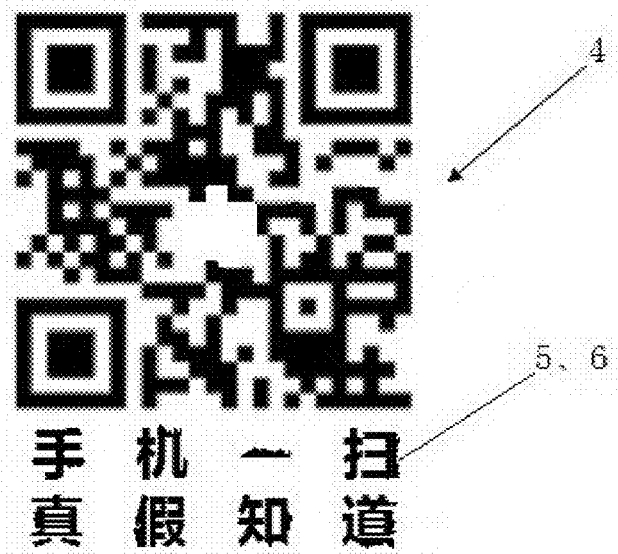
FIG. 15 is a schematic view of an electronic file of a code and an image-text with a preset saw tooth edge in an embodiment of the invention.
Figure 16:
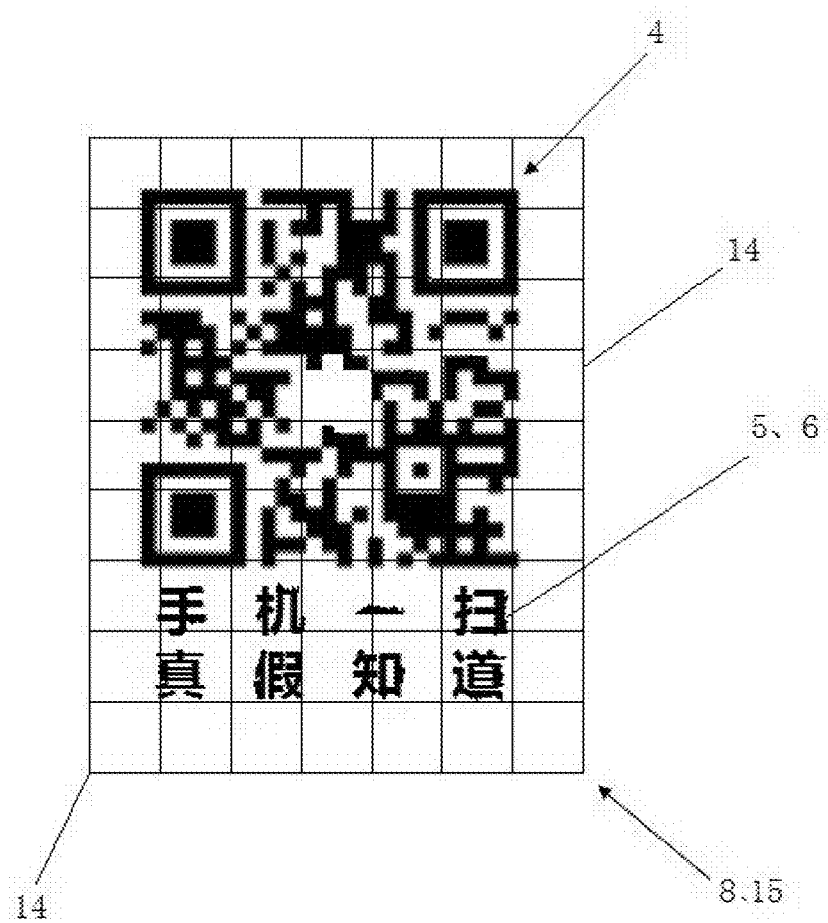
FIG. 16 is a schematic view of a simulating picture obtained after the electronic file in FIG. 15 is added with interfering strips.

As shown in FIG. 15 and FIG. 16, the HP Indigo digital printer (1) can be adopted to print incoming printing materials (2).

Before printing, some individual saw tooth edges (6) are automatically generated by software, then randomly uploaded to codes (4) and/or image-texts (5) that originally have no individual saw tooth edges (6) and are provided by a management person, thus generating a printed electronic file (13) added with the individual saw tooth edges (6). Then, the file is printed and output by the HP Indigo digital printer (1). Next, the electronic file (13) with the individual saw tooth edges (6) is deleted without any trace to prevent domestic thieves, and then the individual saw tooth edges (6) with a single saw tooth size S of ≥0.03 mm(H)×0.03 mm(W) are printed.

Figure 24:
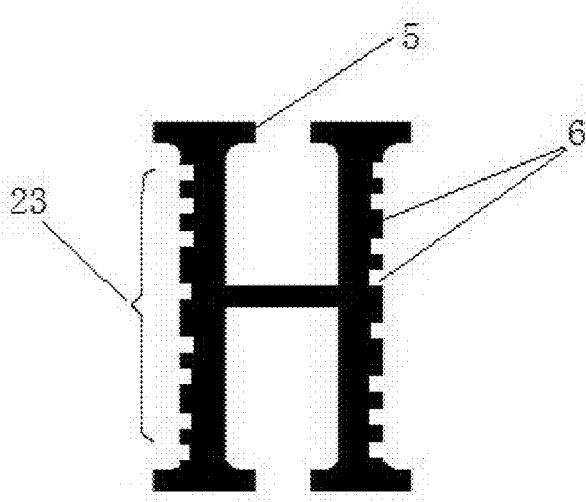
FIG. 24 is an enlarged schematic view of an image-text with a binary code in an embodiment of the invention.

What can be obtained is that, as shown in FIG. 24, by adopting the above printing method, some individual saw tooth edges (6) can be automatically generated with encrypted software and then uploaded onto a letter H such that a plurality of single saw teeth are arranged into a (binary) code (23) which represents certain meanings. As shown in FIG. 24, the protruding saw teeth on the letter H represent number 1, while the recessions represent the letter 0. In this way, a code (23) arrayed from the top down on the left side of the letter H is a binary number 010101101101011010 (namely a decimal number 88922), and a code (23) arrayed from the top down on the right side of the letter H is a binary number 010110101101101010 (namely a decimal number 93034).

A piece of photographing simulating and acquiring software is programmed and downloaded into the HP Indigo digital printer (1). The HP Indigo digital printer (1) prints and outputs the electronic file (13) of the codes (4) and/or image-texts (5) with the individual saw tooth edges (6), converts the electronic file into a simulating picture (15) which is added with interfering strips (14), and then hands over the picture to the management person. The management person uploads the simulating picture (15) combined with the information of the codes (4), as the saw tooth characteristics information, in the database of the ink edge anti-counterfeiting network verification system such that users can check and make a true-or-false verification.

Of course, in order to simplify the process, the electronic file (13) with the individual saw tooth edges (6) and/or marks that are generated before printing can be stored as the saw tooth characteristics information in the database of the ink edge anti-counterfeiting network verification system, instead of adopting the photographing simulating and acquiring software and photographing the picture by a magnifying power. However, such simplified methods will reduce the difficulties in counterfeiting and lowering the anti-counterfeiting effect.

For codes (4) that are formed by the above mentioned method through a series of links including printing and registering, a customer who has a camera phone with WeChat, Baidu, Taobao, and/or Wochacha software can scan the codes, and then the phone can quickly log in to the database of the ink edge anti-counterfeiting network verification system and call up a corresponding picture. Then, the customer can use the camera phone as a magnifying lens to carefully observe if the characteristics of the partial individual saw tooth edges (6) are consistent with the characteristics on the called picture, and then can make a true-or-false judgment by oneself. In order to more conveniently make a true-or-false verification, a customer can download a special anti-counterfeiting inquiry APP, manually compare the characteristics of saw tooth edges (6) or decrypt the (binary) codes (23) to make a true-or-false judgment.

In the invention, a simulating picture (15) with the interfering strips (14) is also uploaded, and then the resolution can be set to be a very low value such that the characteristics information can be seen, but not clearly with the naked eye, and if the characteristics information is printed for counterfeiting, then the printed picture will be seriously distorted and have the interfering strips (14), users can see and know the counterfeit products.

Embodiment 7

A medicine aluminum plastic blister package-printing material (2) is manufactured by adopting invention.

Figure 17:
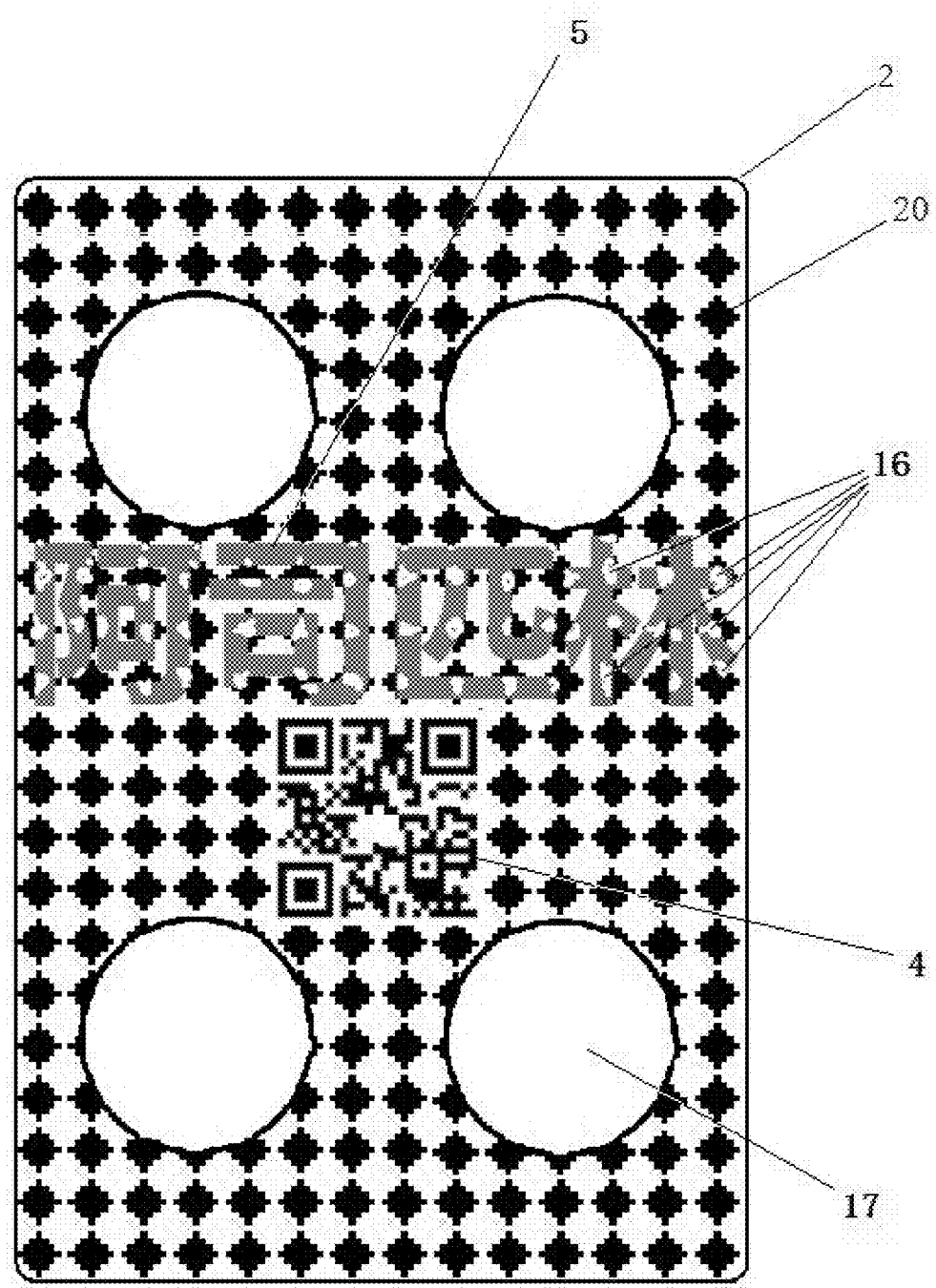
FIG. 17 is a schematic view of an uneven printed face (aluminum plastic blister package of medicines) in an embodiment of the invention.
Figure 18:
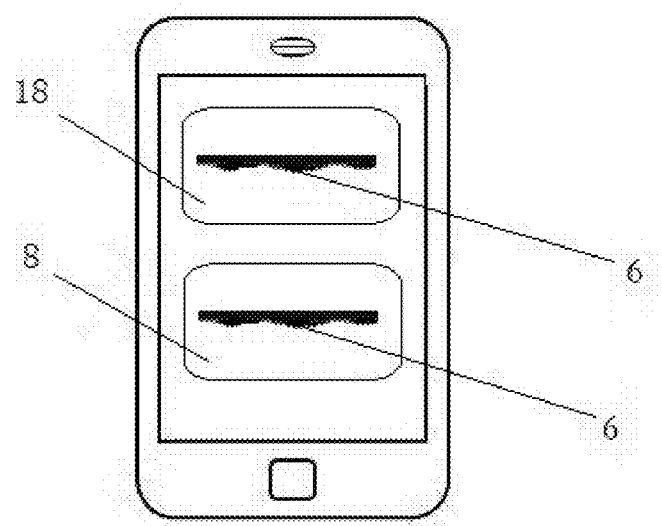
FIG. 18 is a schematic view of a mobile phone screen where a registered saw tooth edge picture (upper) which is called from a database by a user using their own mobile phone and a to-be-detected saw tooth edge picture (lower) which is photographed by the user using their own mobile phone, are displayed.

As shown in FIG. 17, an ink-jet printer (1) jet prints codes on the incoming aluminum plastic blister packages-printing materials (2) such that each one of the aluminum plastic blister packages has an exclusive code (4).

Then, a medicine aluminum plastic blister packaging machine is adopted to hot press and seal pills (17), and a hot pressing template has some convex and convex points, so the aluminum plastic blister packages are pressed with some corresponding recessions (20). Through careful observation, it is found that the recessions (20) generate random micro-damage (including random gaps, random depressions, random protrusions, random twists) to different degrees on the codes (4) and image-texts (5) such as medicine names, specifications and manufacturer names, so the codes (4) and/or image-texts (5) generate micro-damage traces (16) with a size S of ≥0.03 mm(H)×0.03 mm(W), for example the individual saw tooth edges (6).

The micro-damage traces (16) of the codes (4) and/or image-texts (5) are photographed, and the pictures of the micro-damage traces (16) together with the information of the codes (4) are stored as the anti-counterfeiting characteristics information (namely the basis of the true-or-false verification) in the database of the ink edge anti-counterfeiting network verification system such that users can check and make a true-or-false verification. In other words, when the printing material (2) is a packing material such as aluminum plastic blister packaging material, the anti-counterfeiting characteristics information is the information of a micro-damage trace (16) on the code (4) and/or the image-text (5) on the aluminum plastic blister packaging material.

A customer who has a camera phone with WeChat, Baidu, Taobao, and/or Wochacha software can scan the codes, and then the phone can quickly log in to the database of the ink edge anti-counterfeiting network verification system and call up a corresponding picture. Then, the customer can use the camera phone as a magnifying lens to carefully observe if the characteristics of the damage traces are consistent with the characteristics on the called picture, and then can make a true-or-false judgment by oneself. In order to facilitate the anti-counterfeiting verification, customers can download the anti-counterfeiting inquiry APP to realize automatic comparison and make true-or-false judgments by themselves.

Embodiment 8

A QR code with an individual saw tooth edge (6) in a partial area is manufactured by using the invention.

As shown in FIG. 5 and FIG. 7, on a production line of canned beverages, an ink-jet printer (1), for example a UV ink-jet printer, is adopted to print codes on incoming printing materials (2), for example a zip-top can, to generate sequential numbers-codes (4).

The glue dispenser is adopted to dispense a drop of transparent red UV glue onto the central area of the code (4), namely the QR code, a strong wind (11) is blown such that the transparent red UV glue drop is compressed by the wind to generate diffusion and micro-deformation and after being dried, forms an irregular transparent red UV glue image-text (5) as shown in FIG. 7, wherein the transparent red UV glue is doped with 3% fine black powder (for example thin PET sheets with a sheet diameter of 0.05 mm and a thickness of 12 µm).

A digital camera (12) with a micro-lens is needed to photograph the dried code (4) and the transparent red UV glue image-text (5) by a magnifying power, stores and registers the photographed saw tooth characteristics picture (8) in the database of the ink edge anti-counterfeiting network verification system.

For code (4) and the image-texts (5) thereof that are formed by the above mentioned method through a series of links including jet printing, deforming, photographing and registering, a customer who has a camera phone with WeChat, Baidu, Taobao, and/or Wochacha software can scan the code (4) and the image-texts (5); and then the phone can quickly log in to the database of the ink edge anti-counterfeiting network verification system and call up the high-definition saw tooth characteristics picture (8).

Then, the customer can use another or the same camera phone to take a piece of picture—the to-be-detected picture (18) of the characteristics of the magnified saw tooth (edge) of each one of the codes (4) and each one of the transparent red UV glue image-texts (5) on a zip-top can, then observe two pictures in the camera phones with the naked eye to check if the individual saw tooth edges (6) on the two pictures are consistent and if the distribution characteristics of fine black powder (auxiliary anti-counterfeiting characteristics) on the two pictures are consistent to make a true-or-false judgment.

Embodiment 9

Figure 19:
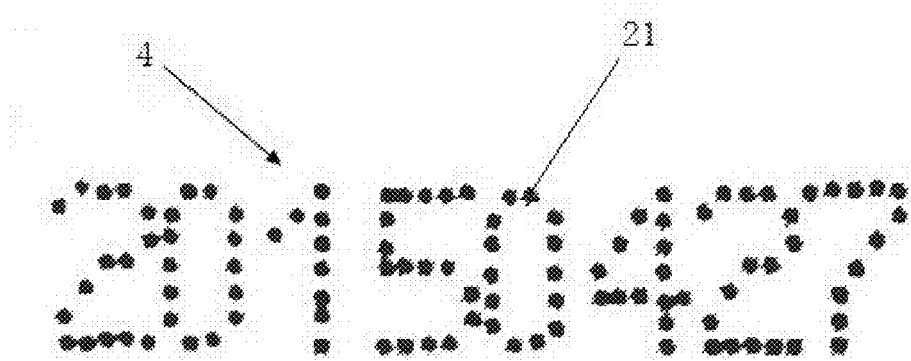
FIG. 19 is a schematic view of a dot matrix printed production date on a packaging material in an embodiment of the invention.
Figure 20:
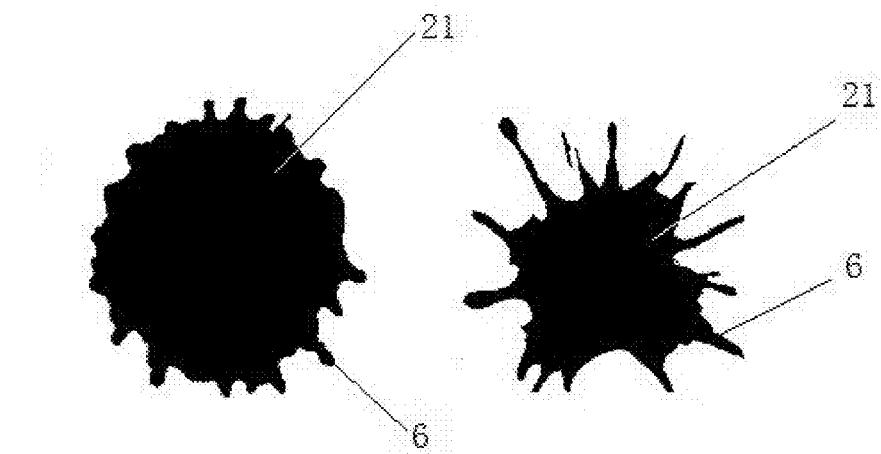
FIG. 20 is an enlarged schematic view of two individual ink dots in FIG. 19 (production date)

As shown in FIG. 19 and FIG. 20, a Videojet 1610DH dye small-character ink-jet printer is selected to jet print codes (4) such as seven-dot character-type production dates on the product packaging materials such as lateral faces of the bottom caps of mineral water bottles, bottoms of the zip-top cans, tops of the tetra milk packs, or bottoms of the cola drink cans on canning production lines.

In order to deform the jetted single ink dots (21) to generate individual saw tooth edges (6), a high-pressure air gun can be equipped at the production line to blow air to the jet printed codes (4) such as production dates, thus urging some single ink dots (21) to generate individual saw tooth edges (6).

Then, an industrial digital camera (12) with a micro-lens is equipped on the canning production line to photograph the dried codes (4) (such as production dates) by a magnifying power, wherein the magnifying power n is set according to the standard that the shapes of the single ink dots (21) in codes (4) can be clearly seen with the naked eye on the photographed saw tooth characteristics picture (8).

The photographed saw tooth characteristics picture (8) and the corresponding production date code (4) with a sequence number are stored in the database of the ink edge anti-counterfeiting network verification system.

To know if a product is real or not a customer can also use a camera phone with a screen size of ≥4 inches and a lens resolution of ≥8 million pixels to take a saw tooth characteristics picture (8) of a code (4) such as the production date at a short distance (for example 55 mm) by a magnifying power, send the picture to the database of the ink edge anti-counterfeiting network verification system in the form of text message, multi-media message or a WeChat message of a WeChat official account, and wait for the ink edge anti-counterfeiting network verification system to verify the saw tooth characteristics and make a true-or-false conclusion.

Embodiment 10

Refer to embodiment 1. This is the simplest implementation mode of the invention.

The ink edge anti-counterfeiting method of the invention is adopted to manufacture an electronic medicine monitoring code-code (4). It looks that the codes (4) have orderly ink edges and reach the level-C printing standard.

An industrial-level micro-lens digital camera (12) is needed to photograph the electronic medicine monitoring codes which generate the individual saw tooth edges (6) after drying by a magnifying power, wherein the magnifying power n is set according to the standard that the individual saw tooth edges (6) on the photographed saw tooth characteristics picture (8) can be clearly seen with the naked eye; the saw tooth characteristics picture (8), the auxiliary anti-counterfeiting characteristics information and the information of the codes (4) together are stored as anti-counterfeiting characteristics information in the database of the ink edge anti-counterfeiting network verification system such that users can make true-or-false verification.

In this way, a user can use a computer (for example PC, WAD/smart phone) which is accessed by the Internet to log in to the database of the ink edge anti-counterfeiting network verification system, key in the electronic medicine monitoring code—code (4) on a medicine, browse (namely retrieve) a corresponding saw tooth characteristics picture (8), magnify the picture and observe if the to-be-detected saw tooth characteristics and quality defect characteristics such as marks on the medicine packaging materials are consistent with all anti-counterfeiting characteristics in the browsed file, for example the saw tooth characteristics picture (8), (magnify and observe the characteristics by using the camera phone or a magnifying lens or other magnifying tools), and then verify if the medicine is real or not (namely make manual self-observation, verification and judgment).

This embodiment is simple and feasible. However, for customers, the anti-counterfeiting verification process seems a little long and troublesome. In terms of anti-counterfeiting type, this method in this embodiment is simple, reliable and globally applicable expert anti-counterfeiting verification means. For customers who need to figure out if products are true or not, this method is a simple and reliable anti-counterfeiting verification means.

Embodiment 11

A QR code with an individual saw tooth edge (6) in a partial area is manufactured by using the invention.

Figure 23:
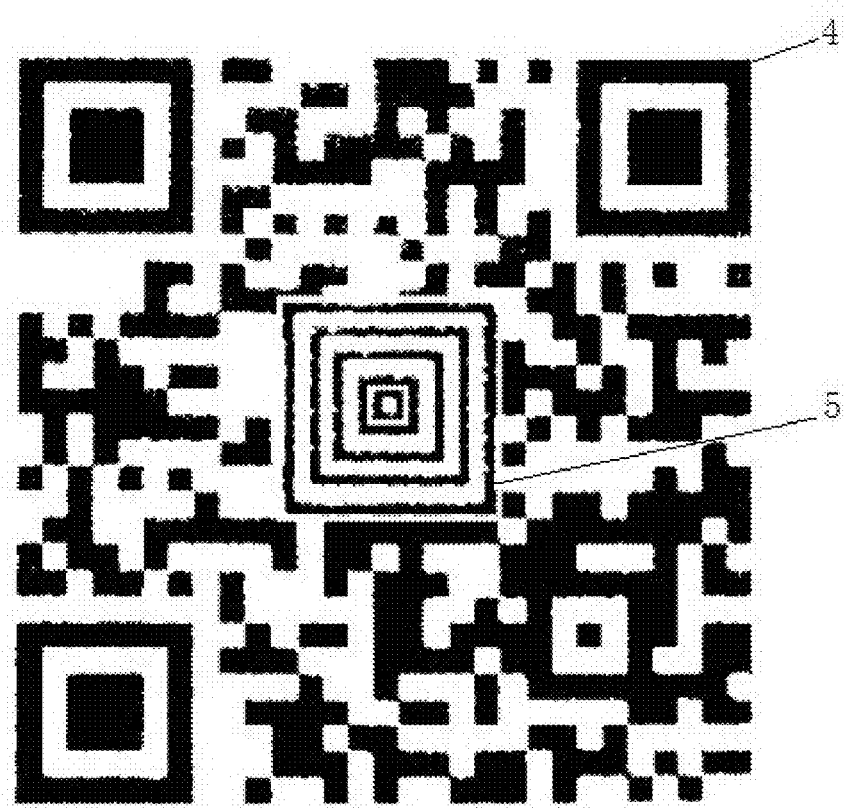
FIG. 23 is a schematic view of a QR code (with multiple Chinese character "hui (回)" in the center) in an embodiment of the invention.

As shown in FIG. 23, an ink-jet printer (1), for example a UV ink-jet printer, is adopted to print codes on printing materials (2) to generate a QR code with an image-text (5) in the shape of multiple Chinese character "hui (回)"-code (4) in the printed center.

A digital camera (12) with a micro-lens is needed to photograph the image-text (5) in the shape of multiple Chinese character "hui (回)" in the center of the dried code (4) by a magnifying power, stores and registers the saw tooth characteristics information of the photographed saw tooth characteristics picture (8) of the image-text (5) in the shape of multiple Chinese character "hui (回)" in the database of the ink edge anti-counterfeiting network verification system.

For codes (4) and the image-texts (5) thereof in the shape of multiple Chinese character "hui (回)" that are formed by the above mentioned method through a series of links including jet printing, deforming, photographing and registering, a customer who has a camera phone with WeChat, Baidu, Taobao, and/or Wochacha software can scan the code (4) and the image-text (5) in the shape of multiple Chinese character "hui (回)"; and then the phone can quickly log in to the database of the ink edge anti-counterfeiting network verification system and call up the high-definition saw tooth characteristics picture (8).

The user can use another camera phone to take a picture of a magnified image-text (5) in the shape of multiple Chinese character "hui (回)"—the to-be-detected picture (18), check the two pictures with the naked eye, observe if the saw tooth characteristics of the image-texts (5) in the shape of multiple Chinese character "hui (回)" on the two pictures are identical, and then make a true-or-false judgment. To facilitate anti-counterfeiting verification, a customer can also download a special anti-counterfeiting inquiry APP, use the camera phone to scan the image-text (5) in the shape of multiple Chinese character "hui (回)" on a printing material (2), compare the acquired to-be-detected saw tooth characteristics information, for example the image-text (5) in the shape of multiple Chinese character "hui (回)", with a corresponding saw tooth characteristics information file, verify the information, send the verification conclusion to the camera phone, thus realizing automatic comparison and automatic anti-counterfeiting verification.

In this embodiment, the line that forms the image-text (5) in the shape of multiple Chinese character "hui (回)" has a very long total length, so the probability of generating a random saw tooth edge (6) is very high. In this way, during production, it is easy to achieve the random saw tooth edge (6) on the printing material (2), and the quality is better guaranteed. During identification, it is easy to identify and verify if a product is real or not. Moreover, the saw tooth characteristics picture (8) occupies a very small storage space, thus saving space.

The above embodiments are just preferable embodiments of the invention. It should be noted that, for those ordinarily skilled in the art, various improvements can be made on the basis of the principle of the invention. The improvements shall also fall within the protective scope of the invention. In particular during the anti-counterfeiting verification, variations of the method, namely the approach where only auxiliary anti-counterfeiting characteristics (those characteristics are very difficult to create, record and identify, and those characteristics are quality defects which do not exist) are verified, and the approach where the saw tooth characteristics (those characteristics are very easy to create, record and identify) are intentionally not verified shall also fall within the protective scope of the invention.

What is claimed is:

1. An ink edge anti-counterfeiting method, comprising:
   (a) printing, by a printer (1), an anti-counterfeiting portion with at least one randomly generated saw tooth edge (6) on a printing material (2) to be anti-counterfeited, wherein the anti-counterfeiting portion includes a preset code (4) and/or an image-text (5), wherein sizes of one or more saw teeth of the at least one saw tooth edge (6) are within preset ranges so that after being photographed by a magnifying power which is not smaller than a preset magnifying power the one or more saw teeth on a photographed picture are capable of being observed by a naked eye, and
   wherein the one or more saw teeth are within the preset size ranges in which, maximum height is about 0.3 mm, and minimum height is about 0.03 mm;
   (b) photographing, by a camera (12), the one or more saw teeth by a magnifying power which is not smaller than the preset magnifying power to acquire saw tooth characteristics information on the at least one saw tooth edge (6) and storing the acquired saw tooth characteristics information in a database in a way of corresponding to information of the code (4);
   (c) receiving, by the camera (12), information of a to-be-verified code (4) and/or a to-be-detected saw tooth characteristics information on a to-be-verified printing material (2) that is sent from a camera phone of a user, and
   (d) comparing, by the camera (12), the to-be-detected saw tooth characteristics information with corresponding saw tooth characteristics information stored in the database
   to verify if the printing material (2) is real or not by performing an anti-counterfeiting verification.

2. The method according to claim 1, characterized in that the anti-counterfeiting portion with the at least one randomly generated saw tooth edge (6) is printed by one or more of following printing methods:
   printing method 1, comprising:
      printing the code (4) and/or the image-text (5) on the printing material (2), and
      extruding or air blowing or scrapping undried printing ink (3), which forms the code (4) and/or the image-text (5), in a time period from end of printing to beginning of drying, wherein an external force is used to drive ink edge of the code (4) and/or the image-text (5) to generate random diffusion and micro-deformation so as to form an individual saw tooth edge (6) of the at least one randomly generated saw tooth edge (6);
   printing method 2, comprising:
      enhancing leveling property of the printing ink (3) and/or drying the undried printing ink (3) in a time-delayed way after printing to increase diffusion and deformation amplitude of ink edge of the code (4) and/or the image-text (5) so as to form the individual saw tooth edge (6);
   printing method 3, comprising:
      pre-printing a diffusant coating at a position of the code (4) and/or the image-text (5) on a printing material (2),
      printing the code (4) and/or the image-text (5) on the diffusant coating, and
      driving the undried printing ink (3) to speed up diffusing or shrinking to form the individual saw tooth edge (6);
   printing method 4, comprising:
      printing the code (4) and/or the image-text (5) on uneven printing material (2), and
      driving the code (4) and/or the image-text (5) to generate random fragmentary micro-deformation in virtue of uneven characteristics of a printed face to form the individual saw tooth edge (6);
   printing method 5, comprising:
      jet printing a code (4) and/or an image-text (5) on the printing material (2),
      applying a cold wave membrane (10) onto electronic printing ink (3) which forms the code (4) and/or the image-text (5) in the time period from the end of printing to the beginning of drying, and pressing the membrane with a compression roller (9), and drying the code (4) and/or the image-text (5) and tearing off the cold wave membrane (10) to transfer a part of a transfer layer (7) on the cold wave membrane (10) onto the code (4) and/or the image-text (5) such that the code (4) and/or the image-text (5) forms the individual saw tooth edge (6) with a clear profile;

printing method 6, comprising:
hot printing the code (4) and/or the image-text (5) on the printing material (2) by using a hot wave membrane (10) such that the code (4) and/or the image-text (5) forms the individual saw tooth edge (6) with a clear profile;

printing method 7, comprising:
generating an electronic file (13) with the individual saw tooth edge (6) and/or mark, and
printing the electronic file (13) on the printing material (2) as the individual saw tooth edge (6);

printing method 8, comprising:
when the printing material (2) is an aluminum plastic blister packaging material, jet printing the code (4) onto the aluminum plastic blister packaging material, and
hot pressing and sealing the aluminum plastic blister packaging material such that an image-text (5) is randomly damaged to form the individual saw tooth edge (6);

printing method 9, comprising:
jetting one or more ink dots (21) onto the printing material (2) by using an ink-jet printer (1), wherein the one or more ink dots (21) splash to form the individual saw tooth edge (6);

printing method 10, comprising:
drying undried printing ink (3) with a time delay of 0.01-10 s after printing so as to increase the diffusion and deformation amplitude of the ink edge of a code (4) and/or an image-text (5) to form the individual saw tooth edge (6);

printing method 11, comprising:
adding 0.5-5% of retarder into the printing ink (3) to increase diffusion and deformation amplitude of the ink edge of a code (4) and/or the image-text (5) to form the individual saw tooth edge (6);

printing method 12, comprising:
printing the code (4) and/or the image-text (5) on a printing material (2),
applying a membrane onto the printing material (2) and undried printing ink (3), and
rolling the membrane first and then drying the printing ink (3) such that the ink edge of the code (4) and/or the image-text (5) forms the individual saw tooth edge (6) along the rolling trajectory;

printing method 13, comprising:
selecting slack sized paper with a sizing degree of 0.25-0.75 mm or unsized paper as a printing material (2), and
printing the code (4) and/or the image-text (5) on the printing material (2) to increase diffusion and deformation amplitude of the ink edge of the code (4) and/or the image-text (5) to form the individual saw tooth edge (6).

3. The method according to claim 2, characterized in that the one or more saw teeth are arrayed into a code (23) which represents certain meanings on the individual saw tooth edge (6) which is printed by adopting the printing method 7.

4. The method according to claim 2, characterized in that when the printing method 1 or printing method 5 is adopted to print the anti-counterfeiting portion with the randomly generated saw tooth edge (6), the compression roller (9) has an uneven roller face.

5. The method according to claim 1, characterized in that the anti-counterfeiting verification is carried out by adopting one or more of the following verification methods:

verification method 1, comprising:
scanning the code (4) on the printing material (2) by using the camera phone,
calling up a saw tooth characteristics picture (8) from the database according to the information of the code (4),
selecting the camera phone with a lens resolution of ≥8 million pixels as a magnifying lens,
placing the camera of the phone at a position at a distance of smaller than 290 mm away from the code (4) and/or an image-text (5), and
magnifying the individual saw tooth edge (6) on the printing material (2) by a magnifying power, observing if the magnified individual saw tooth edge is identical with the individual saw tooth edge (6) on the saw tooth characteristics picture (8) with the naked eye for making a true-or-false judgment;

verification method 2, comprising:
photographing the code (4) and/or the image-text (5) on the printing material (2) by using the camera phone with a lens resolution of ≥8 million pixels to acquire the information of the code (4) and the to-be-detected picture (18) of the individual saw tooth edge (6),
calling up the saw tooth characteristics picture (8) from the database according to the acquired information of the code (4),
displaying the to-be-detected picture (18) and the saw tooth characteristics picture (8) on the screen of the mobile phone, and
observing if the individual saw tooth edge (6) on the to-be-detected picture (18) is identical with the individual saw tooth edge (6) on the saw tooth characteristics picture (8) with the naked eye for making a true-or-false judgment;

verification method 3, comprising:
photographing the code (4) and/or the image-text (5) on the printing material (2) by using the camera phone with a lens resolution of ≥8 million pixels to acquire the information of the code (4) and the to-be-detected picture (18) of the individual saw tooth edge (6),
uploading the to-be-detected picture (18) to an ink edge anti-counterfeiting network verification system to verify the picture,
if the code (4) is consistent, feeding back the information of a primary verification conclusion and a link of a final verification conclusion or awaiting countdown time prompt information to the camera phone of the user,
in a period of time before the link of the final verification conclusion is opened by the user, or during the waiting time, accurately analyzing and verifying the to-be-detected picture (18) and the saw tooth characteristics picture (8) and making a final verification conclusion by the ink edge anti-counterfeiting network verification system, waiting for the user to open the link or waiting for the time to expire, acquiring the final conclusion, and if the code (4) is inconsistent, feeding back the information about the verification conclusion that a product is a counterfeit product to the camera phone of the user;

verification method 4, comprising:

acquiring marking characteristics information on the code (4) and/or the image text (5), forming the acquired information as an auxiliary anti-counterfeiting characteristics information, storing the auxiliary anti-counterfeiting characteristics information together with the saw tooth characteristics information into the database in a way of corresponding to the information of the code (4), and during the anti-counterfeiting verification, comparing the to-be-detected auxiliary anti-counterfeiting characteristics information and the to-be-detected saw tooth characteristics information with the auxiliary anti-counterfeiting characteristics information with the saw tooth information for making a verification;

verification method 5, comprising:

selecting the camera phone with a lens resolution of ≥8 million pixels to photograph the code (4) and/or the image-text (5) by a magnifying power on the printing material (2) at a micro-distance of less than 290 mm away from the code and/or the image-text, uploading the photographed to-be-detected saw tooth characteristics information on the individual saw tooth edge (6) together with the information of the code (4) to a database, comparing the photographed to-be-detected saw tooth characteristics information on the individual saw tooth edge (6) with a saw tooth characteristics information and verifying the to-be-detected saw tooth characteristics information by an ink edge anti-counterfeiting network verification system, and feeding back the verification conclusion to the camera phone.

6. The method according to claim 5, characterized in that comparing the saw tooth characteristics picture (8) of the saw tooth characteristics information with the to-be-detected picture (18) of the to-be detected saw tooth characteristics information and verifying the to-be-detected picture (18) of the to-be detected saw tooth characteristics information to obtain the verification conclusion comprises:

when the quality of the photographed to-be-detected picture (18) meets preset requirements, comparing the saw tooth characteristics picture (8) and the to-be-detected picture (18) by using a preset alignment algorithm to obtain the verification conclusion; and when the quality of the photographed to-be-detected picture (18) does not meet the preset requirements, sending the to-be-detected picture (18) and the saw tooth characteristics picture (8) to an on-line human-aided verification address, and receiving the verification conclusion fed back after manual verification.

7. The method according to claim 1, characterized in that when the printing method 5 is adopted to print the anti-counterfeiting portion with the at least one randomly generated saw tooth edge (6), the transfer layer (7) on the cold wave membrane (10) has random distribution characteristics information, wherein the random distribution characteristics information includes at least one of the following characteristics information:

the transfer layer (7) is pre-molded with a laser image-text, the transfer layer (7) is pre-printed with a colorful image-text, and the transfer layer (7) is pre-mixed with fine powder randomly, wherein the random distribution characteristics information on the transfer layer (7) on the code (4) and/or the image text (5) is acquired and stored as primary auxiliary anti-counterfeiting characteristics information in the database, and association relationship between a primary auxiliary anti-counterfeiting characteristics information and the information of the code (4) is established and stored in the database, and wherein in accordance with the information of the to-be-verified code (4), the saw tooth characteristics information associated with the information of the to-be-verified code (4) is searched in the database and carrying out the anti-counterfeiting verification on the to-be-detected saw tooth characteristics information according to the searched saw tooth characteristics information comprises:

searching the saw tooth characteristics information and the primary auxiliary anti-counterfeiting characteristics information that are associated with the information of the to-be-verified code (4) in the database according to the information of the to-be-verified code (4) of the to-be-verified printing material (2), and carrying out anti-counterfeiting verification on the basis of the searched saw tooth characteristics information and the primary auxiliary anti-counterfeiting characteristics information.

8. The method according to claim 7, characterized in that printing ink doped with fine powder is adopted to print the code (4) and/or the image-text (5) on the printing material (2), or the printing material (2) is provided with some randomly distributed fine powder, wherein the fine powder has a width in the range of 0.01-0.05 mm, and a length in the range of 0.2-0.6 mm, wherein the random distribution characteristics information of the fine powder in the code (4) and/or the image-text (5) is acquired and stored as secondary auxiliary anti-counterfeiting characteristics information in the database, and association relationship between a secondary auxiliary anti-counterfeiting characteristics information and the information of the code (4) is established and stored in the database, and wherein in accordance with the information of the to-be-verified code (4), the secondary auxiliary anti-counterfeiting characteristics information, which is associated with the information of the to-be-verified code (4) is searched in the database, and anti-counterfeiting verification is carried out on the to-be-verified printing material (2) according to the searched secondary auxiliary anti-counterfeiting characteristics information.

9. The method according to claim 8, characterized in that carrying out the anti-counterfeiting verification on the to-be-verified printing material (2) according to the searched secondary auxiliary anti-counterfeiting characteristics information comprises:

searching the secondary auxiliary anti-counterfeiting characteristics information which is associated with the information of the to-be-verified code (4) in the database according to the information of the to-be-verified code (4) of the to-be-verified printing material (2), and carrying out the anti-counterfeiting verification on the length-width ratio of the fine powder recorded in the to-be-detected secondary auxiliary anti-counterfeiting characteristics information on the basis of the length-width ratio of the fine powder recorded in the secondary auxiliary anti-counterfeiting characteristics information.

10. The method according to claim 9, characterized in that the fine powder is fluff with a width within the range of 0.01-0.05 mm and a length within the range of 0.2-0.6 mm.

11. The method according to claim 1, characterized in that when the anti-counterfeiting portion with the at least one randomly generated saw tooth edge (6) is printed, electronic printing ink (3) which is added with a flattening agent is further adopted to jet ink and print the code (4) and/or the image-text (5) on the printing material (2), or the transfer layer (7) of the code (4) and/or the image-text (5) is covered with a transparent flattening protective layer.

12. The method according to claim 1, characterized in that the anti-counterfeiting portion on the printing material (2) is further partially photographed by a magnifying power which is not smaller than the preset magnifying power to acquire a partial saw tooth characteristics picture (8).

13. The method according to claim 1, characterized in that the preset magnifying power is set on the basis that the anti-counterfeiting portion per square millimeter has a resolution ratio of 125, 250, 500, 1,000, 2,500, 5,000, 10,000, 25,000 or 50,000 pixels at least, and 150,000 pixels at most; or the preset magnifying power is recorded on the basis that the anti-counterfeiting portion per square millimeter has a resolution ratio of 125, 250, 500, 1,000, 2,500, 5,000, 10,000, 25,000 or 50,000 pixels at least, and 150,000 pixels at most.

14. The method according to claim 1, characterized in that the at least one saw tooth edge (6) is formed from a partial area of the code (4) and/or the image-text (5).

15. The method according to claim 1, characterized in that the code (4) and/or the image-text (5) is further partially photographed by a magnifying power which is not smaller than the preset magnifying power to acquire a partial saw tooth characteristics picture (8).

16. An ink edge anti-counterfeiting network verification system, comprising:
a database, wherein the database stores the saw tooth characteristics information of a printing material (2) and association relationship between the saw tooth characteristics information and the information of a code (4), wherein the printing material (2) is printed with an anti-counterfeiting portion with at least one randomly generated saw tooth edge (6), the anti-counterfeiting portion comprising a preset code (4) and/or an image-text (5), wherein one or more saw teeth of the at least one saw tooth edge (6) are within preset size ranges so that after being photographed by a magnifying power which is not smaller than a preset magnifying power, the one or more saw teeth on the photographed picture are capable of being observed by a naked eye, wherein the saw tooth characteristics information is obtained by photographing the anti-counterfeiting portion by a magnifying power which is not smaller than the preset magnifying power, and wherein the one or more saw teeth are within the preset size ranges in which maximum height is about 0.3 mm and the minimum height is about 0.03 mm;
a communication unit of a camera (12) for receiving information of a to-be-verified code (4) of a to-be-verified printing material (2) and/or a to-be-detected saw tooth characteristics information that is sent from a camera phone of a user;
a verification processing unit of the camera (12) for searching the saw tooth characteristics information which is associated with the information of the to-be-verified code (4) in the database in accordance with the information of the to-be-verified code (4), and carrying out anti-counterfeiting verification on the anti-counterfeiting portion of the printing material (2) according to the searched saw tooth characteristics information.

17. The system according to claim 16, characterized by also comprising:
a printing processing unit of a printer (1) for printing the anti-counterfeiting portion on the printing material (2); and
an acquisition and maintenance unit of the camera (12) for acquiring the saw tooth characteristics information of the anti-counterfeiting portion which is photographed by a magnifying power which is not smaller than the preset magnifying power, and the information of the code (4) which marks the printing material (2) exclusively, and storing the acquired materials in the database.

18. The system according to claim 16, operatively coupled with the printing processing unit of the printer, wherein the printing processing unit prints the anti-counterfeiting portion with the at least one randomly generated saw tooth edge (6) by one or more of the following printing methods:
printing method 1, comprising:
printing the code (4) and/or the image-text (5) on the printing material (2) by jetting the printing ink, and
extruding or air blowing or scrapping undried printing ink (3), which forms the code (4) and/or the image-text (5), in a time period from end of printing to beginning of drying, wherein an external force is used to drive ink edge of the code (4) and/or the image-text (5) to generate random casting micro-deformation so as to form an individual saw tooth edge (6) of the at least one randomly generated saw tooth edge (6);
printing method 2, comprising:
enhancing leveling property of the printing ink (3) and/or drying the undried printing ink (3) in a time-delayed way after ink-jet printing to increase casting deformation amplitude of ink edge of the code (4) and/or the image-text (5) so as to form the individual saw tooth edge (6);
printing method 3, comprising:
pre-printing a diffusant coating at a position of the code (4) and/or the image-text (5) on a printing material (2),
printing the code (4) and/or the image-text (5) on the diffusant coating, and
driving the undried printing ink (3) to speed up diffusing or shrinking to form the individual saw tooth edge (6);
printing method 4, comprising:
printing a code (4) and/or an image-text (5) on uneven printing material (2),
driving the code (4) and/or the image-text (5) to generate random fragmentary micro-deformation in virtue of the uneven characteristics of a printed face to form the individual saw tooth edge (6);
printing method 5, comprising:
jet printing the code (4) and/or the image-text (5) on the printing material (2),
applying a cold wave membrane (10) onto electronic printing ink (3) which forms the code (4) and/or the image-text (5) in the time period from the end of printing to the beginning of drying, and pressing the membrane with a compression roller (9), and drying the code (4) and/or the image-text (5) and tearing off the cold wave membrane (10) to transfer a part of a transfer layer (7) on the cold wave membrane (10) onto the code (4) and/or the image-text (5) such that the code (4) and/or the image-text (5) forms the individual saw tooth edge (6) with a clear profile;

printing method 6, comprising:

hot printing the code (4) and/or the image-text (5) on the printing material (2) by using a hot wave membrane (10) such that the code (4) and/or the image-text (5) forms the individual saw tooth edge (6) with a clear profile;

printing method 7, comprising:

generating an electronic file (13) with the individual saw tooth edge (6) of the code (4) and/or the image-text (5), and printing the electronic file (13) on the printing material (2) to print the individual saw tooth edge (6);

printing method 8, comprising:

when the printing material (2) is aluminum plastic blister packaging material, jet printing the code (4) onto the aluminum plastic blister packaging material, and hot pressing and sealing the aluminum plastic blister packaging material such that an image-text (5) is randomly damaged to form the individual saw tooth edge (6);

printing method 9, comprising:

jetting one or more ink dots (21) onto the printing material (2) by using an ink-jet printer (1), and drying and curing the one or more ink dots to form the individual saw tooth edge (6).

19. The system according to claim 18, characterized in that when the printing method 5 is adopted to print the anti-counterfeiting portion with the at least one saw tooth edge (6), the transfer layer (7) on the code (4) and/or the image-text (5) has random distribution characteristics information, wherein the random distribution characteristics information includes at least one of the following characteristics information:

the transfer layer (7) is pre-molded with a laser image-text, the transfer layer (7) is pre-printed with a colorful image-text, and the transfer layer (7) is pre-mixed with fine powder randomly, the acquisition and maintenance unit acquires the random distribution characteristics information on the transfer layer (7) on the code (4) and/or the image text (5), stores the acquired information as primary auxiliary anti-counterfeiting characteristics information in the database, establishes association relationship between the primary auxiliary anti-counterfeiting characteristics information and the information of the code (4), and stores the established association relationship in the database, wherein in accordance with the information of the to-be-verified code (4) of the to-be-verified printing material (2), the verification processing unit searches the saw tooth characteristics information and the primary auxiliary anti-counterfeiting characteristics information that are associated with the information of the to-be-verified code (4) in the database, and carries out the anti-counterfeiting verification on the basis of the searched saw tooth characteristics information and the primary auxiliary anti-counterfeiting characteristics information.

20. The system according to claim 18, characterized in that when the printing method 5 is adopted to print the anti-counterfeiting portion with the at least one randomly generated saw tooth edge (6), the printing process unit further adopts the electronic printing ink (3) which is added with a flattening agent to jet ink and print the code (4) and/or the image-text (5) on the printing material (2), or further applies a transparent flattening protective layer onto the transfer layer (7) of the code (4) and/or the image-text (5).

21. The system according to claim 18, characterized in that, the printing processing unit further adopts printing ink doped with fine powder to print the code (4) and/or the image-text (5) on the printing material (2), or applies some randomly distributed fine powder onto the printing material (2), wherein the fine powder has a size within the range of: $0.05 \text{ mm} \geq W \geq 0.01 \text{ mm}$;

the acquisition and maintenance unit further acquires the random distribution characteristics information of the fine powder in the code (4) and/or the image-text (5), stores the acquired information as secondary auxiliary anti-counterfeiting characteristics information in the database, establishes association relationship between the secondary auxiliary anti-counterfeiting characteristics information and the information of the code (4), and stores the established association relationship in the database;

in accordance with the information of the to-be-verified code (4) of the to-be verified printing material (2), the verification processing unit further searches the saw tooth characteristics information and the secondary auxiliary anti-counterfeiting characteristics information that are associated with the information of the to-be-verified code (4) in the database, and carries out the anti-counterfeiting verification on the basis of the searched saw tooth characteristics information and the secondary auxiliary anti-counterfeiting characteristics information.

22. The system according to claim 18, characterized in that, when the quality of the photographed to-be-detected picture (18) meets the preset requirements, the verifying processing unit further compares a saw tooth characteristics picture (8) with the to-be-detected picture (18) by using a preset alignment algorithm and verifies the to-be-detected picture (18) to obtain the verification conclusion; and, when the quality of the photographed to-be-detected picture (18) does not meet the preset requirements, the verification processing unit sends the to-be-detected picture (18) and the saw tooth characteristics picture (8) to an on-line human-aided verification address, and receives the verification conclusion fed back after manual verification.

23. The system according to claim 18, characterized in that the verification processing unit further receives a verification request that is sent from the camera phone of the user and carries the information of the code (4) of the to-be-verified printing material (2), wherein on receiving the verification request, the verification processing unit searches the saw tooth characteristics picture (8), which is associated with the information of the code (4) of the to-be-verified printing material (2) in the database and sends the searched saw tooth characteristics picture (8) to the camera phone of the user to utilize the saw tooth characteristics picture (8) and the to-be-detected picture (18) of the to-be-verified printing material (2) to carry out the anti-counterfeiting verification on the side of the camera phone of the user, wherein the to-be-detected picture (18) is obtained through photographing the anti-counterfeiting portion of the to-be-verified printing material (2) at a distance which is smaller than a preset distance to a photographed object by adopting a magnifying power which is not smaller than a preset magnifying power by using a lens with a resolution which is greater than a preset pixel threshold.

* * * * *